US012791321B1

(12) United States Patent
Liu

(10) Patent No.: US 12,791,321 B1
(45) Date of Patent: Nov. 10, 2026

(54) TIME UNIFICATION METHOD BASED ON PULSAR SEQUENCE NUMBER RULE, AND TIME USER SYSTEM

(71) Applicant: BEIJING ORIENTAL INSTITUTE OF MEASUREMENT AND TEST, Beijing (CN)

(72) Inventor: Min Liu, Beijing (CN)

(73) Assignee: BEIJING ORIENTAL INSTITUTE OF MEASUREMENT AND TEST, Beijing (CN)

( * ) Notice: Subject to any disclaimer, the term of this patent is extended or adjusted under 35 U.S.C. 154(b) by 176 days.

(21) Appl. No.: 18/853,306

(22) PCT Filed: Feb. 20, 2023

(86) PCT No.: PCT/CN2023/077094
§ 371 (c)(1),
(2) Date: Jun. 20, 2025

(87) PCT Pub. No.: WO2023/213111
PCT Pub. Date: Nov. 9, 2023

(30) Foreign Application Priority Data

May 5, 2022 (CN) ......................... 202210482311.0

(51) Int. Cl.
*G01C 21/16* (2006.01)
*G01C 25/00* (2006.01)

(52) U.S. Cl.
CPC ......... *G01C 21/183* (2020.08); *G01C 21/165* (2013.01); *G01C 25/00* (2013.01)

(58) Field of Classification Search
CPC ..... G01C 21/183; G01C 21/165; G01C 25/00
See application file for complete search history.

(56) References Cited

U.S. PATENT DOCUMENTS 6,278,945 B1 * 8/2001 Lin ......................... G01S 19/26 701/472
10,132,933 B2 * 11/2018 Nallampatti Ekambaram ............ G01S 19/42

(Continued)

FOREIGN PATENT DOCUMENTS

CN 111142358 A 5/2020
CN 111665709 A 9/2020

(Continued)

OTHER PUBLICATIONS

International Search Report of PCT/CN2023/077094.

(Continued)

*Primary Examiner* — Richard M Camby

(57) ABSTRACT

A time unification method based on a pulsar sequence number rule, the method comprising: creating a wide-area inertial coordinate system, and agreeing on the origin of coordinates as a spatio-temporal reference point, which is referred to as an O-point for short (101); agreeing on a consistent initial epoch for a plurality of pulsars, wherein on the basis of the initial epoch, when measured by different observers, the times of arrival, at the O-point, of pulse signals with the same serial number of the same pulsar, are the same after the times of arrival are converted into the times of arrival measured at a viewing angle of an observer at the O-point (102); a space timekeeping subsystem broadcasting pulse serial number information, and transmitting the initial epoch within a spatio-temporal span of a pulse period, or inheriting an initial epoch agreed on by the existing space timekeeping subsystem (103).

20 Claims, 6 Drawing Sheets

(56) References Cited

U.S. PATENT DOCUMENTS

| | | | | |
|---|---|---|---|---|
| 2004/0064252 | A1* | 4/2004 | Kirkland .............. | G01C 21/183<br>701/511 |
| 2005/0192719 | A1* | 9/2005 | Sheikh ..................... | B64G 1/36<br>701/13 |
| 2019/0332067 | A1 | 10/2019 | Zhao et al. | |

FOREIGN PATENT DOCUMENTS

| | | | |
|---|---|---|---|
| CN | 115097712 | A | 9/2022 |
| WO | 2022001458 | A1 | 1/2022 |

OTHER PUBLICATIONS

Written Opinion of PCT/CN2023/077094.

Min Liu et al. "Study on the Concept of Space Time A Keeping System", Journal of Electronic Measurement and Instrumentation, Apr. 30, 2021.

Min Liu et al. "A Proposal of Workgroup for Space Time-Keeping System", URSJ GASS, Sep. 4, 2021.

* cited by examiner

TIME UNIFICATION METHOD BASED ON PULSAR SEQUENCE NUMBER RULE, AND TIME USER SYSTEM

CROSS-REFERENCE TO RELATED APPLICATIONS

This application is a national stage application of PCT/CN2023/077094. This application claims priorities from PCT Application No. PCT/CN2023/077094, filed Feb. 20, 2023, and from the Chinese patent application 202210482311.0 filed May 5, 2022, the content of which are incorporated herein in the entirety by reference.

TECHNICAL FIELD

The present disclosure relates to the technical field of time measurement, and in particular to a time unification method based on pulsar serial number (or sequence number) rule and a time user system.

BACKGROUND

The China Association for Science and Technology has selected the top ten cutting-edge scientific questions of the year 2021, in which the paper "Is there a unified time rule outside of Earth?" believes that the time rules on Earth are not applicable to the vast universe, and proposes that a space timekeeping system is established on a method of unifying time by reproducing the proper time using an atomic clock on the solar system's mass center coordinate system and reproducing the coordinate time using pulsars. The paper "Research on the Concept of Space Timekeeping System" (DOI: 10.13382/j.jemi. B2104152) published in the Journal of Electronic Measurement and Instrumentation (April 2021), as well as Chinese patent application for invention titled "Method for Unifying Time in Wide Area Space and Space Timekeeping System" with publication number CN111665709A and publication date Sep. 15, 2020, provide a detailed explanation of the principle and implementation method of a space timekeeping system. However, they do not further explain how to agree on an initial epoch of pulsars, how to achieve time unification between different space timekeeping subsystems based on serial number rules of pulsars, and how time rules can be used by users.

Due to the influence of relativistic effect, simultaneity is only defined within the same one coordinate system, and there is no simultaneity between different coordinate systems, making it impossible to directly compare with the proper time. In order to unify time, a common coordinate system must be chosen first, which is the wide area inertial coordinate system. The origin of the wide area inertial coordinate system and the time at infinity are the basis for unifying time throughout the entire area. A pulse signal emitted by the pulsar is considered as a coordinate time signal at infinity. How to use distant pulse signals to achieve time unification throughout the entire gravitational potential range (or "throughout the entire area") is currently the problem that needs to be solved. At present, the pulsar observation technology, including ground-based radio astronomical observation and X-ray detector observation on spacecraft, can select pulsars with stable pulse periods as time frequency reference standards. However, there is currently no technical solution that can be used for reference to achieve time unification based on pulsars for observers on two different local area coordinate systems (also referred to as timekeeping subsystems).

SUMMARY

Technical Problem

In order to overcome the disadvantages in the prior art mentioned above, the present disclosure provides a time unification method based on pulsar serial number rule and a time user system, which can solve the problem that the prior art cannot achieve time unification based on pulsars for observers on two different local area coordinate systems (also referred to as timekeeping subsystems).

Technical Solution

Embodiments of the present application provide a time unification method based on pulsar serial number rule, and a time user system.

According to a first aspect of the present application, a time unification method based on pulsar serial number rule is provided, which includes:

establishing a wide area inertial coordinate system in an inertial reference frame, and setting a mass center of all masses within its gravitational potential range (or referred to as entire area) as a coordinate origin, hereinafter abbreviated as "Origin-point" (O-point); wherein observers in the wide area inertial coordinate system at least include a space timekeeping subsystem and a time user system; the O-point is a spatial reference point for all observers, with the gravitational potential at the O-point being zero and the observer's velocity at the O-point being zero; the observer at the O-point is named origin-point observer, hereinafter abbreviated as "O-observer"; and for all observers, pulsar pulse signals received by the O-observer and their corresponding pulsars have the following stable characteristics: pulsar orientation, pulse period, and pulse profile;

agreeing on a consistent initial epoch for multiple pulsars to meet the consistency requirement of pulsar serial number rule; wherein the consistency requirement is that for pulse signals with the same serial number from the same pulsar, based on the initial epoch, the time taken to reach the O-point converted into the O-observer's perspective is the same when measured by different observers;

broadcasting pulse serial number information through the space timekeeping subsystem, and transmitting the initial epoch within the spatiotemporal span of one pulse period, or inheriting the initial epoch agreed on by the existing space timekeeping subsystems; and implementing a feedback adjustment mechanism for the space timekeeping subsystem according to the pulse serial number information.

As an implementation, that "the pulsar pulse signals received by the O-observer and their corresponding pulsars have the following stable characteristics: pulsar orientation, pulse period, and pulse profile" includes:

the pulsar orientation is orientation recognition or agreed orientation; the pulse period is period recognition or agreed period; and the pulse profile is pulse profile recognition or agreed profile;

wherein the orientation of a certain pulsar refers to the angular coordinate vector within the wide area inertial coordinate system, which is unanimously recognized by all observers; a dot product of the unit vector of the angular coordinate vector and the coordinates of the observer yields a projection distance of the observer at the orientation of the certain pulsar; wherein the dot product is a vector operation rule; in the direction from the O-point to the certain pulsar, the pulse signals sweep or reach the observer in the form of a plane electromagnetic wave, and also sweep or reach the O-point; a projection distance between the observer and the O-point in this direction and a time difference between the coordinate times when the plane electromagnetic wave of the same pulse signal sequentially sweeps the observer and the O-point conform to a two-dimensional spatiotemporal relationship, i.e., $\Delta t=d/c$, where $\Delta t$ is the time difference expressed in coordinate time in the unit of the Second of International System of Units (SI second); d is the projection distance of the observer in the direction of the certain pulsar in the unit of SI meter; and c is the speed of light.

As an implementation, the pulse periods of the multiple pulsars have set stability, wherein the set stability criterion for the pulse periods includes that:

the agreed pulse periods of multiple pulsars are constants of a stable set, which are unanimously recognized by all observers, with the unit being SI second; the stable set refers to the phenomenon where pulse serial numbers and pulse periods of multiple pulsars received by the O-observer maintain a certain proportional relationship; the pulse serial numbers refer to the continuous pulse numbering sent by the pulsars after the initial epoch; and for k pulsars, the stable set expression is:

$$t_{oSSB} = n^{(1)}T_1 - p_1 + q_1(t) = n^{(2)}T_2 - p_2 + q_2(t) = \ldots = n^{(k)}T_k - p_k + q_k(t); \quad (1)$$

in formula (1), k=1, 2, . . . , represents multiple pulsars named or numbered 1, 2, . . . , k; $t_{oSSB}$ is the coordinate time at the O-point, and the unit is SI second; $n^{(k)}$ represents the serial number of the pulse of the pulsar named k reaching the O-point, and the superscript (k) represents the naming; $T_k$ is the period of pulsar, and the unit is SI second; pr is the initial phase of the pulse profile of pulsar; $q_k(t)$ is the time difference between the moment $t_{oSSB}$ and the moment when the integer pulse reaches the O-point; when an $n^{(k)}$ integer carrying event occurs, $q_k(t)=0$ and $q_k(t)<T_k$, and the unit is SI second;

the set stability criterion includes: if the pulsars are numbered k=1, 2, . . . k in order of pulse period size, such as $T_1 \le T_2 \le \ldots \le T_k$, then maximum allowable deviations $\varepsilon_2, \varepsilon_3, \ldots, \varepsilon_k$ are set for 2 to k pulsars respectively to construct a criterion array to the right of the inequality sign in inequation (4), where NC represents no criterion; if a certain element of the lower left triangle matrix in the criterion array in inequation (4) does not meet the inequality condition, then the period of the pulsar corresponding to the element that does not meet the condition is adjusted, or is removed from the set of pulse periods;

$$\begin{bmatrix} \frac{1}{T_1} \\ \frac{1}{T_2} \\ \vdots \\ \frac{1}{T_k} \end{bmatrix} [T_1 \; T_2 \; \ldots \; T_k] - \begin{bmatrix} n^{(1)} \\ n^{(2)} \\ \vdots \\ n^{(k)} \end{bmatrix} \left[ \frac{1}{n^{(1)}} \; \frac{1}{n^{(2)}} \; \ldots \; \frac{1}{n^{(k)}} \right] \le \quad (4)$$

-continued $$\begin{bmatrix} 0 & NC & \ldots & NC & NC \\ \frac{2}{n^{(1)}} + \varepsilon_2 & 0 & \ldots & NC & NC \\ \frac{2}{n^{(1)}} + \varepsilon_3 & \frac{2}{n^{(2)}} + \varepsilon_3 & 0 & \ldots & \vdots \\ \vdots & \vdots & \vdots & \ddots & NC \\ \frac{2}{n^{(1)}} + \varepsilon_k & \frac{2}{n^{(2)}} + \varepsilon_k & \ldots & \frac{2}{n^{(k-1)}} + \varepsilon_k & 0 \end{bmatrix}.$$

As an implementation, that the pulse profile is pulse profile recognition or agreed profile includes:

the pulse profile of the pulsar means that each pulsar has a profile with its own characteristics, and the pulsar's own characteristics include shape characteristics in amplitude and phase characteristics in time; and the initial phase of the pulse profile of the O-observer is consistent, and a phase waveform of a specific radiation spectrum is agreed on; through transformation of time coordinate axis, the pulse profile expressed by the coordinate time of the O-observer is used by all observers as the unanimously recognized pulse profile.

As an implementation, by broadcasting and receiving pulse serial number information, it is possible to transmit the initial epoch of the pulsar from the space timekeeping subsystem to the observer.

The pulse serial number information broadcasted by the space timekeeping subsystem includes at least one of the following:

the pulsar name k, the pulse serial number $n^{(k)}$, and the time when the pulse reaches the O-point, i.e., the pulse origin time $t_{nk}$; the space timekeeping subsystem x as a broadcaster, the moment when the space timekeeping subsystem x receives the pulse serial number $n^{(k)}$, the projection distance $d_{xk}$ from the space timekeeping subsystem x to the O-point, and a delay time $t_{dx}$ for processing signals by the space timekeeping subsystem x; and the initial epoch of the pulsar means that for all pulsars recognized or agreed on by the space timekeeping subsystems, at the moment when the pulse numbered zero thereof reaches the O-point, the value of coordinate time is zero, and its initial phase is the difference between the starting point of the pulse profile and the origin of the time axis. For observers who have newly joined the space timekeeping system, such as a new space timekeeping subsystem or a time user system, a transmission or inheritance process is required to obtain the agreed initial epoch of the pulsar in one time, so that the initial epoch of its coordinate time (or time axis origin, or time zero point) is unified with other space timekeeping subsystems.

Transmitting the initial epoch from the space timekeeping subsystem to the observer specifically includes:

the time difference between adjacent integer serial numbers of the pulses is one pulse period interval; within a spatiotemporal range of one pulse period interval, observer b receives the pulse serial number information sent from the space timekeeping subsystem a; if the sum of information processing delay and spatial transmission delay is $\Delta t_s$, which is smaller than the pulse period $T_k$, i.e., $T_k>\Delta t_s$, then observer b can calculate the delay time $\Delta t_s$ from the observation results of the pulse event after receiving the pulse serial number information, and translate the time axis of coordinate time to achieve the transmission of initial epoch from the space timekeeping subsystem a to observer b. Specifically, the pulse event refers to the time when the pulse signal of the pulsar reaches the O-point and the corresponding serial number, represented as: event (serial number, time), and non-O-observers need to calculate to obtain the pulse event; observer b inherits the pulse event ($n^{(k)}$, $t_{ank}$) of the pulsar named k from the pulse serial number information of the space timekeeping subsystem a. The inheritance means that observer b assigns a value $t_{abnk}$ to the time corresponding to the event serial number $n^{(k)}$ of the pulsar named k. Then, after observing for a period of time, observer b measures and calculates the next pulse event ($n^{(k)}+1$, $t_{bnk}$); since within the spatiotemporal range of one pulse period, $T_k$ should be $\geq(t_{bnk}-t_{abnk})$, when and only when the initial epochs of observer b and the space timekeeping subsystem a are the same, the equal sign holds. Since $\Delta t_s=t_{abnk}-t_{ank}$, which is further expressed as $t_{bnk}-t_{abnk}=(T_k-\Delta t_s)$, where $t_{bnk}$ is the observation result of observer b, $t_{abnk}$ is inherited by observer b, numerically equal to $t_{ank}$, and $T_k$ is a known parameter from the pulsar database, the delay $\Delta t_s$ can be calculated. Then, by translating the time axis of coordinate time of b, the influence of the delay $\Delta t_s$ in the pulse serial number information is eliminated, so that the initial epochs of b and a are the same, that is, $t_{bnk}=t_{ank}+T_k$.

Translating the time axis of coordinate time means that a certain observer modifies the time $t_{bnk}$ in the observed pulse event ($n^{(k)}+1$, $t_{bnk}$) to make $t_{bnk}=t_{ank}+T_k=t_{abnk}+(T_k-\Delta t_s)$, and also modifies the serial number $n^{(j)}$ in the pulse event of another pulsar named j, which should meet the requirements of inequation (4), then $n'^{(j)}=n^{(j)}+[(T_k-\Delta t_s)/T_j]$, where $n^{(j)}$ and $n'^{(j)}$ are serial numbers of the pulsar named j before and after the observer's translation, respectively, $T_j$ is the period of pulsar j, $(T_k-\Delta t_s)$ is the translation amount of the coordinate time, and [•] is a truncation and rounding operator;

alternatively, the inheriting the initial epoch agreed on by the existing space timekeeping subsystems includes that it can be specifically achieved by translating the coordinate axis of coordinate time: within the spatiotemporal span of one period, the space timekeeping subsystem a and observer b observe that the same one pulse signal of the same one pulsar reaches the O-point, and the pulse event ($n^{(k)}$, $t_{nk}$) is unique. The process of inheriting the initial epoch is only performed once to obtain the unanimously recognized initial epoch; the events referred to by the space timekeeping subsystem a and observer b are not limited to pulse events, but also include known events agreed on by both parties, which include bidirectional electromagnetic wave signals.

As an implementation, the implementing a feedback adjustment mechanism for the space timekeeping subsystem according to the pulse serial number information includes:

forming a first database by the pulse serial number information broadcasted by the space timekeeping subsystem and the pulse serial number information received by all observers;

judging by the observer whether the pulse event is abnormal; in the case of an abnormal pulse event, adjusting the initial epoch of the coordinate axis of coordinate time to eliminate the anomaly by translating the time axis of coordinate time, wherein the translation amount is an integer multiple of the pulse period $T_x$ of the pulsar; and adjusting an orbit parameter ephemeris of the observe to converge the time deviation of the pulse event to be smaller than $\pm 0.5$ $T_x$.

As an implementation, the "judging by the observer whether the pulse event is abnormal; in the case of an abnormal pulse event, adjusting the initial epoch of the coordinate axis of coordinate time to eliminate the anomaly by translating the time axis of coordinate time" includes:

at least three space timekeeping subsystems are configured, each of which independently measures multiple pulsars to obtain pulse events, and broadcast the pulse serial number information to other observers based on the obtained pulse events;

the observers receive the pulse serial number information broadcasted by the at least three space timekeeping subsystems, and generate a first data table classified by pulsars and indexed by pulse serial numbers; wherein the leftmost column of the first data table is the pulse serial number, and the different columns in the same row are the time information in the pulse events of various space timekeeping subsystems; some cells in the first data table allow for no-data items;

according to the consistency requirement of the initial epoch and pulsar serial number rules, the time measured for the same pulse event by different observers is the same; the pulse serial number and the time measured by different space timekeeping subsystems in the same row in the first data table should theoretically be the same, also known as consistency criterion;

each observer checks the difference between the time in the pulse event and an average value of the time in the pulse events of other space timekeeping subsystems; if the difference exceeds one pulse period, the initial epoch is adjusted and the coordinate axis of coordinate time is translated, so that the time in the pulse event of the observer is consistent with the average value; the differences in the time in the same pulse event between the space timekeeping subsystems participating in the average value calculation should be smaller than or equal to the period of the pulsar corresponding to that pulse; if the differences in the time in the same pulse event between the space timekeeping subsystems participating in the average value calculation are larger than the value of the period of the pulsar corresponding to that pulse, or larger than a set threshold, then the principle of the minority being subordinate to the majority is adopted; after excluding the space timekeeping subsystem with the largest deviation, the average value of time is calculated, and the initial epoch of the time coordinate axis is adjusted with the re-determined average value of time; alternatively, the time in the pulse event observed on Earth is used as a reference;

in the first data table, the observer preferentially checks whether the pulse events of long-period pulsars are abnormal, and then checks the pulse events of short-period pulsars, so that the pulse events meet the requirement that under the same serial number within a certain allowable deviation range, the difference between the observer's time and the average value of time is smaller than one pulse period $T_x$.

As an implementation, the adjusting an orbit parameter ephemeris of the observe to converge the time deviation of the pulse event to be smaller than $\pm 0.5$ $T_x$ includes:

if, after feedback adjustment is performed for at least one period of revolution orbit, each space timekeeping subsystem can ensure that in the table row corresponding to the pulse serial number of each pulsar in the first data table, the time of the same serial number row is within a certain allowable deviation range, then it indicates that the consistency criterion is met; for space timekeeping subsystems that exceed the allowable deviation, the local orbit parameter ephemeris is adjusted to reduce the time deviation;

the local orbit parameter ephemeris plays a regulatory role in the following two calculation processes:

the process of calculating the delay time from local area to O-point using orbital position parameters and assigning O-point time to pulse events; and using local orbit parameters for transforming from the proper time to the coordinate time during the pulse profile measurement process.

As an implementation, the method further includes:

each space timekeeping subsystem stores the same pulsar database, which is a set of multiple pulsar ephemerides, and the pulsar ephemerides include at least one of the following information: name of the pulsar, an azimuth vector of the pulsar, a pulse profile of the pulsar, an initial phase of the pulse profile, a zero-phase model of the pulse profile, a pulse period of the pulsar, a correction value of the pulse period, and a correction value of the initial phase; and each space timekeeping subsystem checks its own pulse serial number information database and generates a second data table classified by the space timekeeping subsystems and indexed by the coordinate time; the leftmost column of the second data table is the coordinate time of the local observer, and the different columns in the same row are integer serial numbers of different pulsars at this moment; the serial numbers of the same row are taken as the input for the set stability criterion inequation (4), and the matrix difference to the left of inequation (4) is calculated to obtain the set stability deviation.

According to a second aspect of the present application, the time user system is provided, which includes: a proper time measurement device, a pulsar measurement device, a device for receiving broadcast information, a local orbit parameter ephemeris, a pulse serial number information database, and a pulse serial number rule;

the local orbit parameter ephemeris includes at least one of the following: a local position vector, a local velocity vector, and a local gravitational potential indexed by the local proper time and with the O-point as a reference;

the proper time measurement device is used to obtain the local proper time;

the pulsar pulse measurement device is used to observe the pulse profile of the pulsar based on the local proper time, obtain the coordinate time at the moment when the pulse of the pulsar reaches the local area, and then use the local orbit parameter ephemeris to calculate the delay time of projection distance to obtain the O-point time.

As an implementation, the time user system has the same hardware and software configuration as the space timekeeping subsystem, except that it cannot broadcast the pulse serial number information; and the time user system is also used to receive the pulse serial number information broadcasted by the space timekeeping subsystems, and update the initial epoch of the coordinate axis of its own coordinate time, the pulsar database and the pulse serial number information database based on the pulse serial number information broadcasted by multiple space timekeeping subsystems.

Advantageous Effects

By defining a coordinate origin of wide area inertial coordinate system, establishing the wide area inertial coordinate system, observing the pulse signals of pulsars through space timekeeping subsystems, and broadcasting the pulse serial number information based on the observation results, transmission or inheritance of the initial epoch is achieved; other space timekeeping subsystems perform feedback adjustments based on the pulse serial number information. The embodiment of the present application implements an agreed rule in the time rules outside of Earth and its application, and provide a time unification method applicable to the entire area, which can be applied to communication, calendars throughout the entire area. The time rule provided in the embodiment of the present application is part of the time unification rules outside of Earth, is applicable to other celestial bodies and spacecrafts outside of Earth, and meets various needs for independent time measurement without relying on timing signals on Earth.

DETAILED DESCRIPTION OF THE INVENTION

Figure 1:
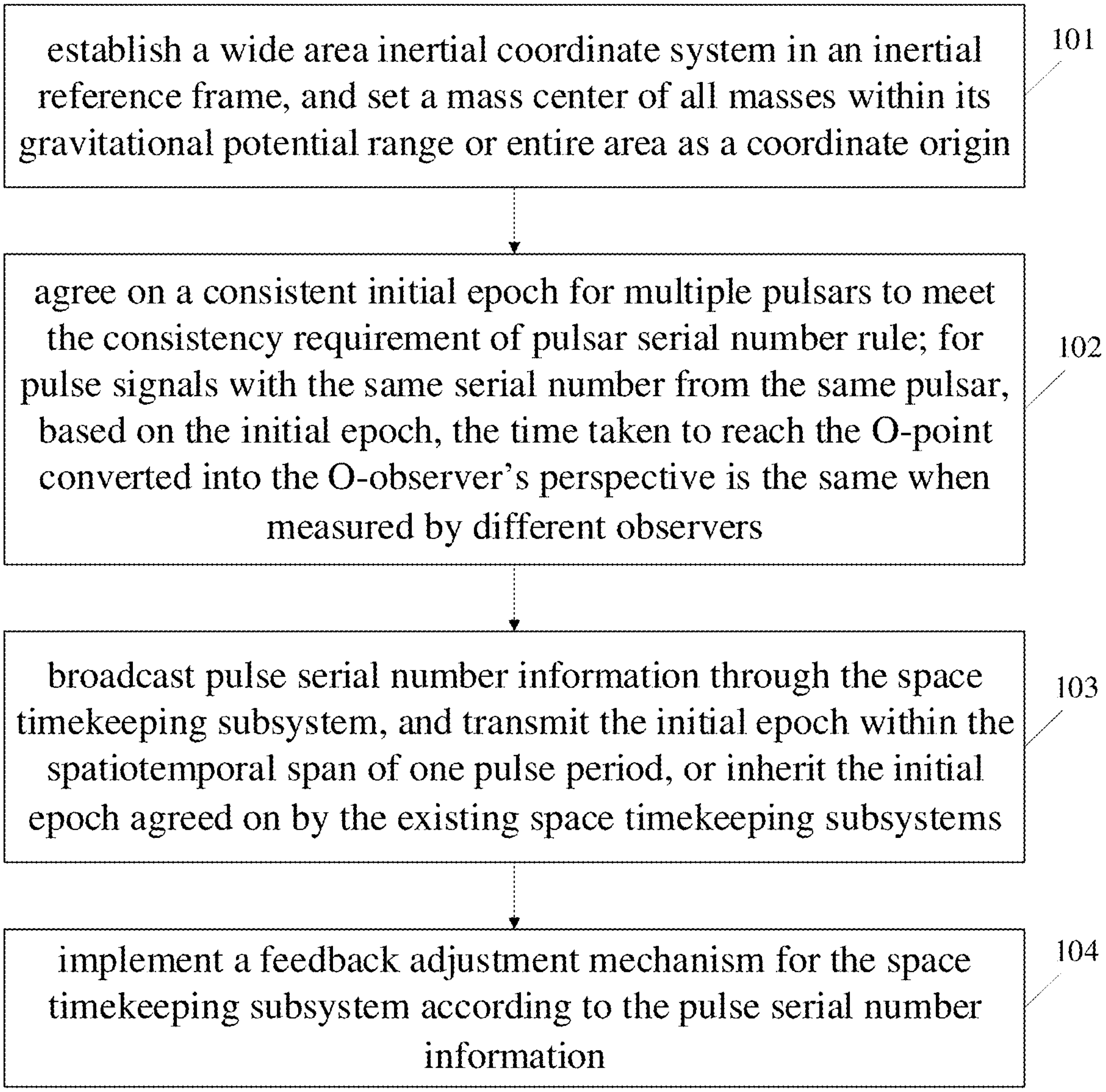
FIG. 1 is a schematic flowchart of a time unification method based on pulsar serial number rule provided in an embodiment of the present application.

In order to more clearly illustrate the embodiments of the present disclosure or the technical solutions in the prior art, drawings required to be used in the embodiments will be briefly described below. Obviously, the drawings in the following description show only some of the embodiments of the present disclosure, and those skilled in the art can also obtain other drawings based on these drawings without creative efforts.

The present disclosure will be described in detail below with reference to the drawings and specific embodiments. It is impossible to describe all the embodiments exhaustively herein, but the embodiments of the present disclosure are not limited to the following embodiments.

Due to the fact that observers on different coordinate systems use their own local proper time as a reference, different pulse periods and pulse signal profiles will be obtained when measuring the pulse signal of the same pulsar. The Chinese patent application with publication number CN111665709A provides a solution to this problem, in which observers transform the measurement data to the origin of a wide area coordinate system, apply algorithms such as Doppler effect time axis transformation, relativistic effect time axis transformation, etc., and convert the data measured by each observer at the proper time to the data expressed by the coordinate time at the origin. These conversion processes are also the basis of the embodiments of the present application. If the relevant technical solutions in the Chinese patent application with publication number CN111665709A are not recorded or are recorded with careless mistakes in the embodiments of the present application, they should not be understood as insufficient disclosure. The rule discussed in the embodiments of the present application is based on the Chinese patent application with the public number CN111665709A, where each observer converts the measurement results to the measurement results of the observer at the origin of the wide area coordinate system.

In order to assist those skilled in the art in understanding, the meaning of phrases and terms in the embodiments of the present application will be reiterated below.

Observer: a measurer at a specific location, which includes the origin of a coordinate system, and the locations of a space timekeeping subsystem, a local area timekeeping system, and a time user system, etc.

Wide area inertial coordinate system: a coordinate system with a stable reference direction, being non rotatable, and having a coordinate origin that is unanimously recognized by all observers.

Agreement and recognition: in the embodiment of the present application, "agreement" and "recognition" have similar semantics; if the judgement made by self-cognition is unanimous with those of others, this is recognition, and the conclusion of unanimous recognition reached through the prescribed method is agreement; when multiple subjects have the same self-cognition, the two expressions can replace each other.

O-point: the origin of a wide area inertial coordinate system; the observer at the origin is called O-observer.

Pulse serial number: the O-observer continuously records the pulses that reach the O-point, and assigns continuous and uninterrupted integer numbers; the serial numbers from different pulsars are unique and monotonically increase.

Initial epoch: by inheriting the definition in the Chinese patent application for invention with public number CN111665709A, the initial epoch is the coordinate time at the moment when the pulse with serial number 0 reaches the O-point.

Space timekeeping subsystem: which refers to a local area timekeeping system (abbreviated as subsystem) in the space timekeeping system described in the Chinese patent application for invention with public number CN111665709A, and which mainly considers that the meaning expressed by "local area timekeeping system" is applicable to coordinate systems and spatial distributions; the "subsystem" in the embodiment of present application is suitable for describing the relationship between parts and the entirety having the same components, and does not care about regional and spatial distribution; three or more subsystems can form a space timekeeping system through broadcast feedback.

Pulse event: which is a combination of pulse serial number and time; when the observer measures a pulse of the pulsar and calculates the time when it reaches the O-point, the serial number and time of the pulse constitute a pulse event; the pulse event is the result of individual measurement by the observer, and the pulse events measured by different observers may be different.

Pulse serial number information: which is a type of information broadcasted by the space timekeeping subsystem to the wide area space, and which has uniqueness; the pulse serial number information includes but is not limited to: name of the pulsar, pulse serial number, pulse origin time, name of the space timekeeping subsystem that broadcasts this information, projection distance from the space timekeeping subsystem to the O-point, delay time of signal processing, and the like.

Pulse serial number information database: which is a set of information consisting of pulse events independently measured by individual observers, along with pulse serial number information broadcasted by other space timekeeping subsystems.

Pulsar ephemeris: by inheriting the definition in the Chinese patent application for invention with public number CN111665709A, the pulsar ephemeris includes: name of the pulsar, an azimuth vector of the pulsar, a pulse profile of the pulsar, an initial phase of the pulse profile, a zero-phase model of the pulse profile, a pulse period of the pulsar, a correction value of the pulse period, and a correction value of the initial phase.

Pulsar database: which is a set of multiple pulsar ephemerides stored in each space timekeeping subsystem and time user and unanimously recognized through broadcasting.

Time user system: which refers to the user who utilizes the space timekeeping system; the user system accepts rules and receives the broadcasted pulse serial number information, and can achieve unified time measurement; except for the lack of authorization for broadcasting the pulse serial number information, the time user system has the same hardware, software and methods as the "space timekeeping subsystem".

FIG. 1 is a schematic flowchart of a time unification method based on pulsar serial number rule provided in an embodiment of the present application. As shown in FIG. 1, the time unification method based on pulsar serial number rule in the embodiment of the present application includes the following processing steps.

Step 101: establishing a wide area inertial coordinate system in an inertial reference frame, and setting a mass center of all masses within its gravitational potential range or entire area as a coordinate origin.

Hereinafter, the origin of the coordinates in the wide area inertial coordinate system is referred to as "O-point"; wherein observers in the wide area inertial coordinate system at least include a space timekeeping subsystem and a time user system; the O-point is a spatial reference point for all observers, with the gravitational potential at the O-point being zero and an observer velocity at the O-point being zero; the observer at the O-point is a O-observer; and for all observers, pulsar pulse signals received by the O-observer and their corresponding pulsars have the following stable characteristics: pulsar orientation, pulse period, and pulse profile.

Step 102: agreeing on a consistent initial epoch for multiple pulsars to meet the consistency requirement of pulsar serial number rule; wherein for pulse signals with the same serial number from the same pulsar, based on the initial epoch, the time taken to reach the O-point converted into the O-observer's perspective is the same when measured by different observers.

Step 103: broadcasting pulse serial number information through the space timekeeping subsystem, and transmitting the initial epoch within the spatiotemporal span of one pulse period, or inheriting the initial epoch agreed on by the existing space timekeeping subsystems.

Step 104: implementing a feedback adjustment mechanism for the space timekeeping subsystem according to the pulse serial number information.

The time rule provided in the embodiment of the present application is part of the time unification rules outside of Earth, is applicable to other celestial bodies and spacecrafts outside of Earth, and meets various needs for independent time measurement without relying on timing signals on Earth.

The specific implementations of the above steps will be described below in detail with reference to specific examples.

The embodiment of the present application defines the coordinate origin (O-point) of the wide area inertial coordinate system which includes all local area coordinate systems within the spatial range covered by a unified time. The O-point has three characteristics: firstly, the origin is recognized by observers in all the coordinate systems, objectively exists, has a fixed location, and is a reference point of time and space for all observers; secondly, the gravitational potential at the origin is zero; and thirdly, the observer velocity at the origin is zero, which means that the observer is stationary relative to himself/herself.

Pulsars have three characteristics that also require recognition from all observers. There are many pulsars, but pulsars that are chosen as reference standard should have three characteristics that are recognized by all observers: first, orientation recognition, or referred to as agreed orientation; then, period recognition, or referred to as agreed period; and finally, pulse profile recognition, or referred to as agreed profile.

The agreed orientation of a specific certain pulsar is recognized by all observers as having consistently the same angular coordinates within the wide area inertial coordinate system. In the direction from the O-point to this pulsar, the pulse electromagnetic signals sweep (or referred to as "reach") the observer in the form of a plane electromagnetic wave, and also sweep (or referred to as "reach") the O-point; a projection distance between the observer and the O-point in this direction and a time difference between the coordinate times when the same pulse sequentially sweeps the observer and the O-point conform to a two-dimensional spatiotemporal relationship, i.e., $\Delta t=d/c$, where $\Delta t$ is the time difference expressed in coordinate time in the unit of SI second; d is the projection distance of the observer in the direction of the certain pulsar in the unit of meter; and c is the speed of light.

Figure 2:
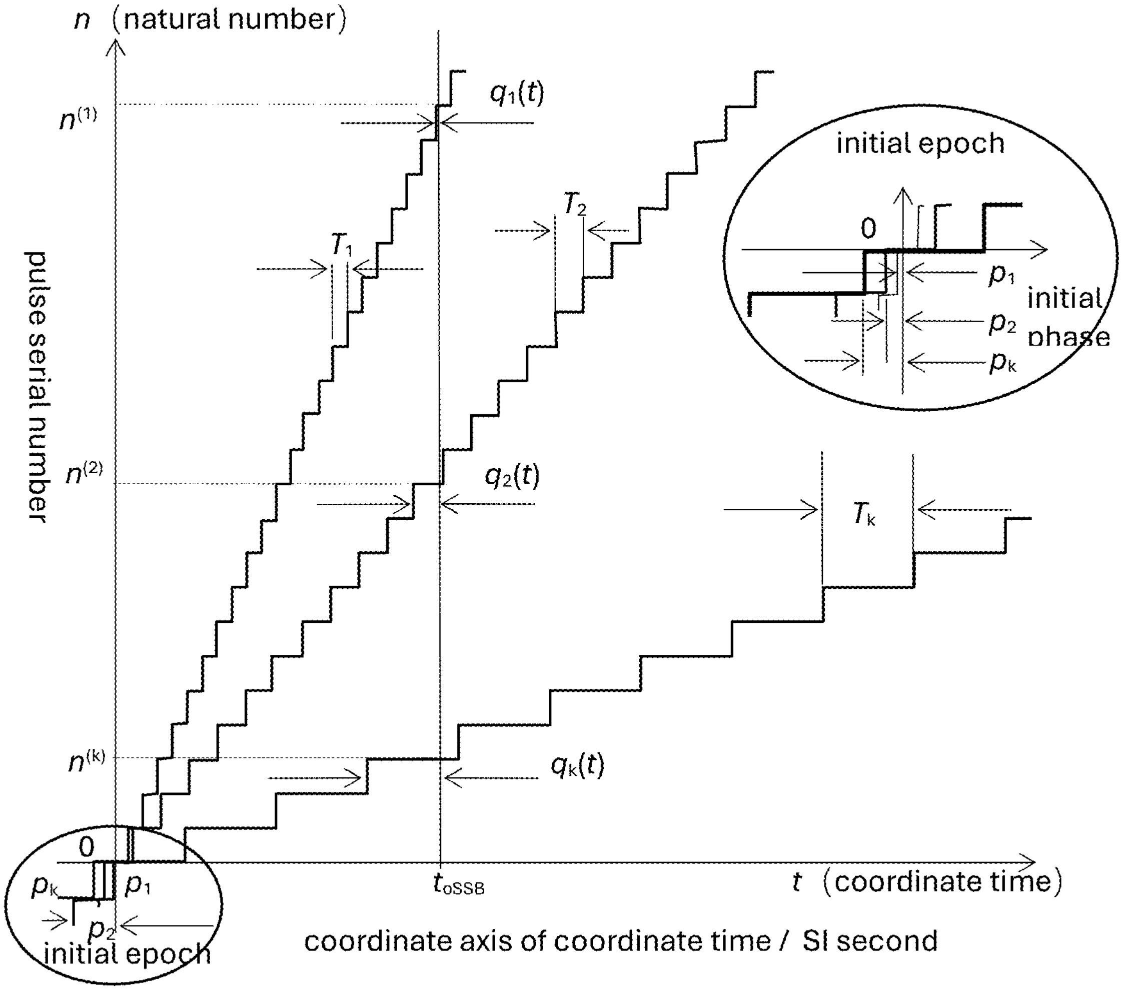
FIG. 2 is a schematic diagram of set stability expression of initial epoch and period of pulsar provided in the embodiment of the present application.

The agreed periods of multiple pulsars are constants of a stable set for all observers, with the unit being SI second. The stable set refers to the phenomenon where pulse serial numbers and pulse periods of multiple pulsars received by the O-observer maintain a certain proportional relationship; specifically, for k pulsars, the stable set expression is:

$$t_{oSSB} = n^{(1)}T_1 - p_1 + q_1(t) = n^{(2)}T_2 - p_2 + q_2(t) = \ldots = n^{(k)}T_k - p_k + q_k(t); \quad (1)$$

where k=1, 2, . . . , represents multiple pulsars named or numbered 1, 2, . . . , k; $t_{oSSB}$ is the coordinate time of the O-observer, and the unit is SI second; $n^{(k)}$ represents the serial number of the pulse of the pulsar named k reaching the O-point, which is a natural number; the superscript (k) represents the naming, and is not an exponential function; $T_k$ is the period of the pulsar named k, and the unit is SI second; pr is the initial phase of the pulse profile of the pulsar named k, and the unit is SI second; q (t) is the time difference between the moment $t_{oSSB}$ and the moment when the integer pulse of the pulsar named k reaches the O-point; when an $n^{(k)}$ carrying event occurs, $q_k(t)=0$ and $q_k(t)$ is not larger than one period, i.e., $q_k(t)<T_k$, and the unit is SI second; the graphical representation of formula (1) is shown in FIG. 2.

After the initial epoch is determined, at a certain moment on the O-point, such as $t_{oSSB}$ moment, each $n^{(k)}$ is compared; if the pulsars are numbered in order of pulse period size, such as $T_1 \leq T_2 \leq \ldots \leq T_k$, then it is found that the ratio of serial number, such as $n^{(2)}/n^{(1)}$ or $n^{(k)}/n^{(1)}$, is approximately the ratio of pulse period, such as $T_1/T_2$ or $T_1/T_k$. The larger the serial number $n^{(1)}$, the smaller the influence of the initial phase and the complete period phase difference, as shown in formula (2) below:

$$\frac{T_1}{T_2} = \frac{n^{(2)}}{n^{(1)}} + \frac{-p_2 + p_1 + q_2(t) - q_1(t)}{n^{(1)}T_2}$$
$$\frac{T_1}{T_k} = \frac{n^{(k)}}{n^{(1)}} + \frac{-p_k + p_1 + q_k(t) - q_1(t)}{n^{(1)}T_k}. \quad (2)$$

The set stability requires that when the serial number n (1) is large enough, the difference between the ratio of agreed periods, such as $T_1/T_2$ or $T_1/T_k$, and the ratio of serial numbers observed at the O-point, such as $n^{(2)}/n^{(1)}$ or $n^{(k)}/n^{(1)}$, should be smaller than a specified value, such as $2/n^{(1)}$. The condition for set stability is shown in formula (3). Otherwise, the pulsar should be replaced. The pulsar that does not meet this requirement is removed from the pulsar set, and replaced with a new pulsar, or the period of the pulsar is re-agreed on.

$$\frac{T_1}{T_2} - \frac{n^{(2)}}{n^{(1)}} = \frac{p_2 - p_1 + q_2(t) - q_1(t)}{n^{(1)}T_2} \leq \frac{2}{n^{(1)}}$$
$$\frac{T_1}{T_k} - \frac{n^{(k)}}{n^{(1)}} = \frac{p_k - p_1 + q_k(t) - q_1(t)}{n^{(1)}T_k} \leq \frac{2}{n^{(1)}}. \quad (3)$$

In the set stability criterion, if the pulsars are numbered k=1, 2, . . . k in order of pulse period size, such as $T_1 \leq T_2 \leq \ldots \leq T_k$, then maximum allowable deviations $\varepsilon_2, \varepsilon_3, \ldots, \varepsilon_k$ are set for 2 to k pulsars respectively to construct a criterion array to the right of the inequality sign in inequation (4), where NC represents no criterion; if a certain element of the lower left triangle matrix in the criterion array in inequation (4) does not meet the inequality condition, then the period of the pulsar represented by that row needs to be adjusted, or is removed from the pulse set. The reason of calling "set stability" lies in the overall stability of the reference pulsar set.

$$\begin{bmatrix} \frac{1}{T_1} \\ \frac{1}{T_2} \\ \vdots \\ \frac{1}{T_k} \end{bmatrix} \begin{bmatrix} T_1 & T_2 & \dots & T_k \end{bmatrix} - \begin{bmatrix} n^{(1)} \\ n^{(2)} \\ \vdots \\ n^{(k)} \end{bmatrix} \begin{bmatrix} \frac{1}{n^{(1)}} & \frac{1}{n^{(2)}} & \dots & \frac{1}{n^{(k)}} \end{bmatrix} \le \begin{bmatrix} 0 & NC & \dots & NC & NC \\ \frac{2}{n^{(1)}}+\varepsilon_2 & 0 & \dots & NC & NC \\ \frac{2}{n^{(1)}}+\varepsilon_3 & \frac{2}{n^{(2)}}+\varepsilon_3 & 0 & \dots & \vdots \\ \vdots & \vdots & \vdots & \ddots & NC \\ \frac{2}{n^{(1)}}+\varepsilon_k & \frac{2}{n^{(2)}}+\varepsilon_k & \dots & \frac{2}{n^{(k-1)}}+\varepsilon_k & 0 \end{bmatrix}. \tag{4}$$

The agreed profile of pulsar means that each pulsar has a unique pulse profile, which has both shape characteristics in amplitude and phase characteristics in time. Its definition is the same as that in the Chinese patent application for invention with public number CN111665709A, and will not be described repeatedly herein. It is recognized by all observers that the O-observer can obtain a stable initial phase of the pulse profile of pulsar, and a phase waveform of a specific radiation spectrum. The similarity of pulse profile does not mean that the waveform has the same amplitude, but means that the maximum correlation coefficient is obtained in the correlation calculation. That is, the pulse profiles measured by different observers may be different due to the influence of relativistic effect, but after time coordinate axis transformation, the pulse profile expressed by the coordinate time of the O-observer is recognized by all observers. For the coordinate axis transformation method and similarity calculation method, reference can be made to the Chinese patent application for invention with public number CN111665709A. The agreed condition emphasized in the embodiment of the present application is that only the O-observer can obtain a stable profile.

In the embodiment of the present application, the initial epoch of pulsar is the corresponding point of the pulse serial number recognized by all observers on the time axis of the coordinate time. The way of transmission of the initial epoch refers to the transmission from the initial epoch of the existing space timekeeping subsystem to the newly added space timekeeping subsystem or time user system.

The pulse serial number information broadcasted by the space timekeeping subsystem includes: {TNx}={pulsar name k; pulse serial number $n^{(k)}$; the time when the pulse reaches the O-point (also known as pulse origin time) $t_{nk}$; the name x of the broadcasting space timekeeping subsystem; the moment when the space timekeeping subsystem x receives the pulse serial number $n^{(k)}$; the projection distance $d_{xk}$ from the space timekeeping subsystem x to the O-point; the delay time $t_{dx}$ for processing signals by the space timekeeping subsystem, etc.}, where x represents distinct space timekeeping subsystem broadcasters. The observers receiving the broadcast adjust their own initial epochs based on the above information, or translate the time axis of the coordinate time so that it is consistent with the initial epoch of the broadcasting subsystem.

Figure 3:
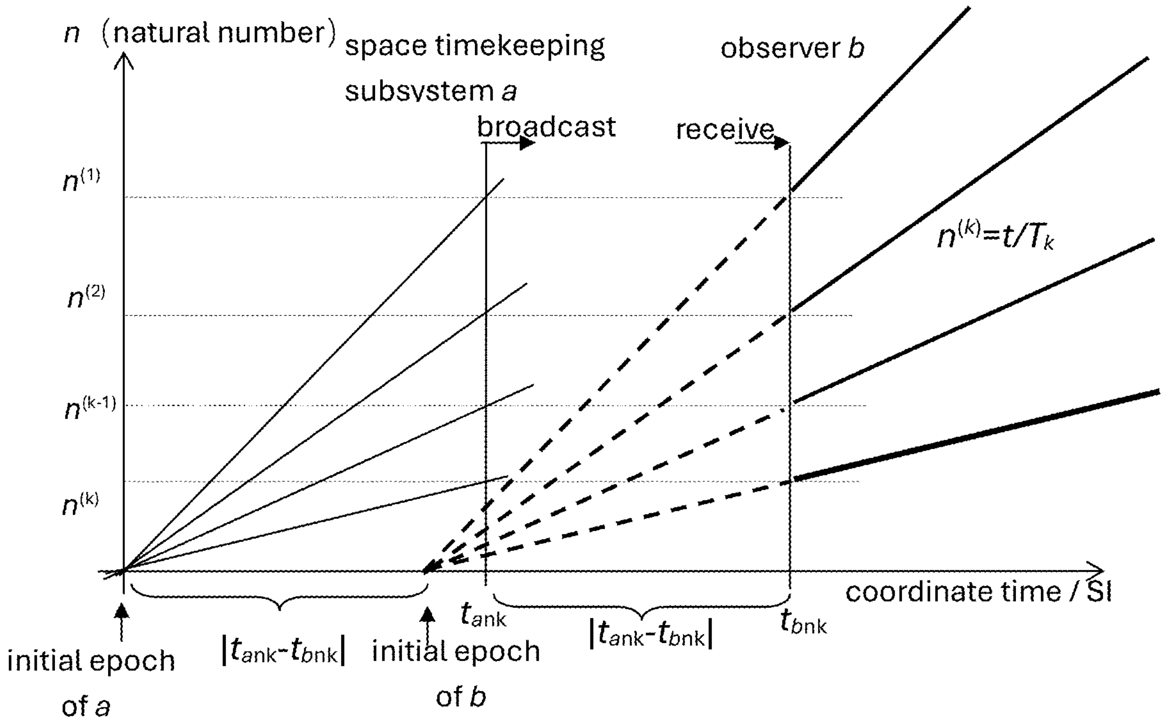
FIG. 3 is a schematic diagram of the relationship between a space timekeeping subsystem a and observer b provided in the embodiment of the present application, when quantized pulse interval is not considered.

FIG. 3 is a schematic diagram of the relationship between a space timekeeping subsystem a and observer b provided in the embodiment of the present application, when quantized pulse interval is not considered. As shown in FIG. 3, the space timekeeping subsystem a is a representative of several space timekeeping subsystems that have unanimously recognized the initial epoch. The space timekeeping subsystem a broadcasts, and the broadcast message contains the pulse serial number information {TNa}. Observer b receives the latest and most recently broadcasted pulse serial number information {TNa}, which should come from the nearest space timekeeping subsystem. Based on the received pulse serial number information {TNa}, observer b initializes the coordinate axis (the vertical axis in FIG. 3, which represents integer numbers) that corresponds to its own pulse serial number and the time coordinate axis (the horizontal axis in FIG. 3, the unit being SI second) into a serial number and time that are consistent with {TNa}, and continues to measure each subsequent pulse event (serial number-time) (obtaining an oblique line $n^{(k)}-t$ representing the relationship between the pulse serial number and the time as shown by the bold line in FIG. 3). In an ideal case, without considering the quantized pulse interval, the slope of the oblique line $n^{(k)}-t$ expressed by the pulse serial number and the coordinate time is $1/T_k$. When it is extended backwards until $n^{(k)}=0$, $t=0$ is the initial epoch of observer b. By inferring the initial epoch, it will be found that there is a difference $|t_{ank}-t_{bnk}|$ between the initial epoch of observer b and the initial epoch of the space timekeeping subsystem a, which is mainly caused by the spatial delay time of the transmission signal.

However, in reality, the pulse serial number information is in a quantitative form, and the time difference between adjacent serial numbers should be one complete pulse period interval. If within the spatiotemporal range of one pulse period interval, the space timekeeping subsystem a and observer b make the sum of the delay time $t_{da}$ for processing pulse information and the delay time for spatial distance $\Delta t_s=t_{da}+|t_{ank}-t_{abnk}|$ smaller than the pulse period $T_k$, that is, $T_k>\Delta t_s$, then observer b inherits the pulse serial number information {TNa} from the space timekeeping subsystem a, independently measures and calculates the delay, and shifts the time axis of coordinate time by $(T_k-\Delta t_s)$. After the influence of delay is eliminated, observer b will keep consistent with the initial epoch of the space timekeeping subsystem a in the pulse event $(n^{(k)}+1, t_{bnk})$, i.e., $t_{bnk}=t_{ank}+T_k$. The shifting the time axis of coordinate time means that a certain observer modifies the time $t_{bnk}$ in the observed pulse event $(n^{(k)}+1, t_{bnk})$ to make $t_{bnk}=t_{ank}+T_k=t_{abnk}+(T_k-\Delta t_s)$, where $(T_k-\Delta t_s)$ is the amount of shift, $t_{bnk}$ and $t_{abnk}$ are the observation results of observer b, and $T_k$ is a known parameter from the pulsar database; at the same time, the observer modifies the serial number $n^{(j)}$ in the pulse event of another pulsar named j, which should meet the requirements of formula (4); then $n'^{(j)}=n^{(j)}+[(T_k-\Delta t_s)/T_j]$, where $n^{(j)}$ and $n'^{(j)}$ are serial numbers of the pulsar named j before and after the observer's shift, respectively, $T_j$ is the period of pulsar j, $(T_k-\Delta t_s)$ is the shift amount of the coordinate time, and [•] is a truncation and rounding operator. That is, within the spatiotemporal span of one complete period, the space timekeeping subsystem a and observer b observe the same pulse of the same pulsar reaching the O-point, and the pulse event $(n^{(k)}, t_{nk})$ is unique. Then, as the spatial distance between the space timekeeping subsystem a and observer b increases, a pulsar with a larger period is required to provide reference. The process of inheriting the initial epoch is carried out once to obtain an unanimously recognized initial epoch, and pulses are subsequently measured continuously, so that transmission is not required any more. For pulsars with longer pulse periods, measurement errors are also larger, and therefore subsequent feedback adjustment is required. Of course, as an implementation, the consistency of initial epoch can also be achieved with the help of pulsars with shorter pulse periods.

This process has transmissibility for more space timekeeping subsystems, that is, if the space timekeeping subsystem a transmits the initial epoch to observer b, and then observer b transmits the initial epoch to space timekeeping subsystem C, then the space timekeeping subsystem a and space timekeeping subsystem C also have the same initial epoch.

To achieve unanimous recognition of the initial epoch, events that can be referred to by the space timekeeping subsystem a and observer b are not limited to long-period pulsars, but can also be known events agreed on by both parties, such as bidirectional electromagnetic wave signals.

Figure 4:
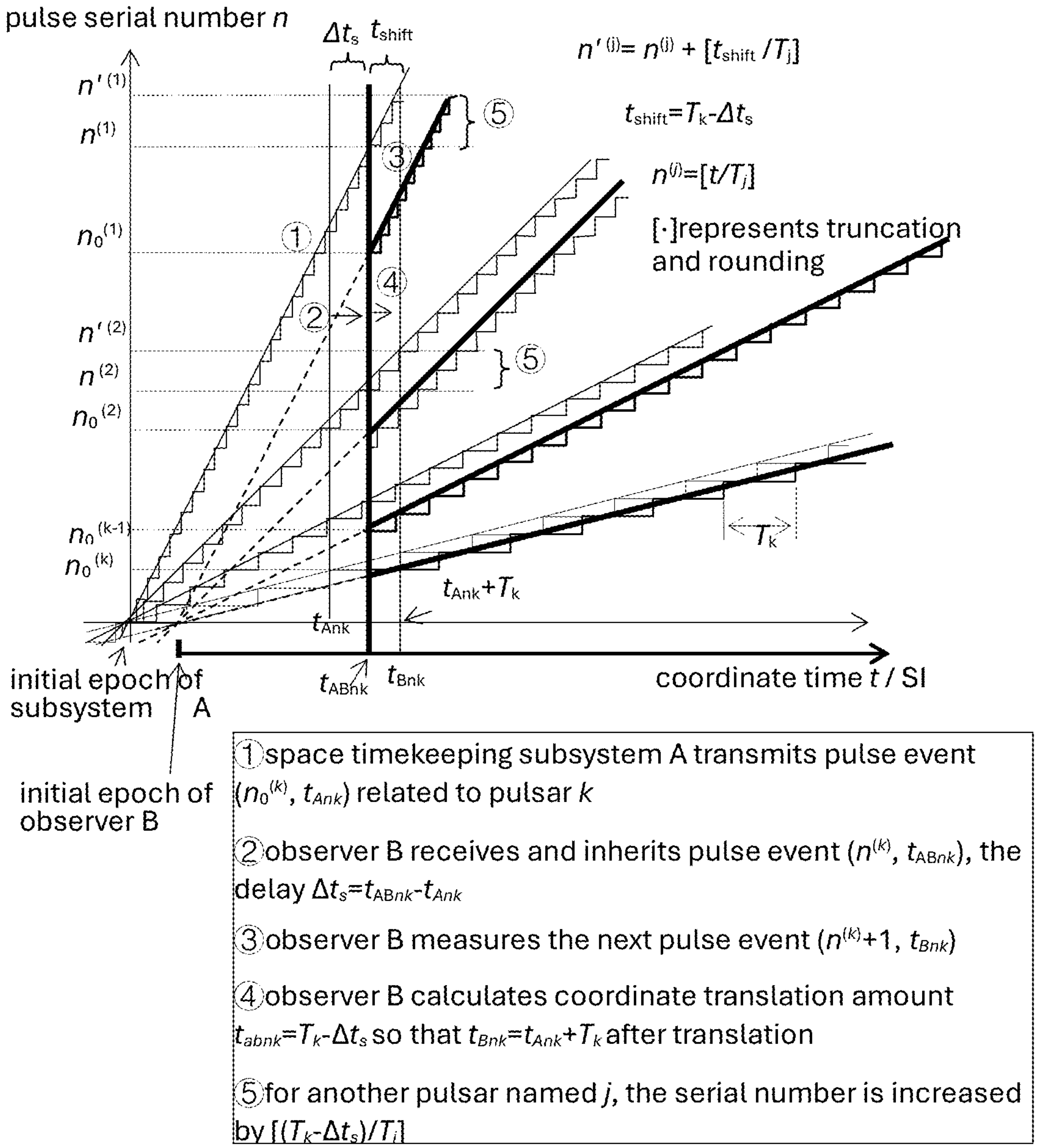
FIG. 4 is a schematic diagram of the relationship between a timekeeping system A and observer B provided in the embodiment of the present application, when quantized pulse interval is considered.

FIG. 4 is a schematic diagram of the relationship between a timekeeping system A and observer B provided in the embodiment of the present application, when quantized pulse interval is considered. As shown in FIG. 4, the space timekeeping subsystem A observes the $n^{(k)}$th pulse of a pulsar named k. According to the method provided in the Chinese patent application for invention with public number CN111665709A, the moment $t_{ank}$ at which the pulse reaches the O-point is calculated, and a pulse event ($n^{(k)}$, $t_{ank}$) is obtained. The projection distance $d_{Ak}$ from the space timekeeping subsystem A to the O-point is obtained by querying the local orbit parameter ephemeris. After a delay of time $t_{dA}$, the space timekeeping subsystem A broadcasts the pulse serial number information {TNA}={k; $n^{(k)}$; $t_{Ank}$; A; $d_{Ak}$; $t_{dA}$; . . . }. After a spatial transmission delay of $t_{ds}$, the broadcast information is received by observer B, who inherits the pulse event of A. At this moment, $t_{ABnk}$ is recorded on the time coordinate axis of B, which is numerically equal to $t_{ank}$. Observer B independently measures the ($n^{(k)}$+1)th pulse of a pulsar named k, and obtains a pulse event ($n^{(k)}$+1, $t_{Bnk}$), $t_{ABnk}$ and $t_{Bnk}$ are both observable points on the coordinate axis of observer B. If A and B are within the spatiotemporal range of one complete period of the pulsar named k, $T_k=(t_{Bnk}-t_{ABnk})$ should be met. If and only if the initial epochs of B and A are the same, the equal sign holds, and the further expression is $t_{Bnk}-t_{ABnk}=(T_k-\Delta t_s)$. Then, by shifting the time axis of coordinate time of b by $T_k-\Delta t_s$, the influence of the delay $\Delta t_s$ of the pulse serial number information can be eliminated, making the initial epochs of b and a be the same, that is, $t_{Bnk}=t_{Ank}+T_k$. Since the pulse period $T_k>(t_{dA}+t_{ds})$, it can be known that the events observed by the space timekeeping subsystem A and observer B within the spatiotemporal range of a complete period are the same pulse, and the space timekeeping subsystem A and observer B obtain the same initial epoch. Therefore, the process of initial epoch transmission is carried out in an order from the largest period size to the smallest period size.

In the embodiment of the present application, the pulse serial number information broadcasted and received by the space timekeeping subsystems constitutes a database; it is judged whether the pulse event is abnormal and whether to eliminate the anomaly by shifting the time axis of coordinate time by an integer multiple of the period $T_x$; and the orbit parameter ephemeris is adjusted to further converge the deviation of the pulse event to be smaller than ±0.5 $T_x$.

Broadcasting the pulse serial number information by the space timekeeping subsystem is the obligation of the space timekeeping subsystem. In order to ensure the stability of the entire space timekeeping system and enable the time user system to obtain time unification information, the space timekeeping subsystem must broadcast the pulse event it measures independently.

In the entire area space, there is always pulse serial number information broadcasted by multiple space timekeeping subsystems, which can be used by the time user system, or the by space timekeeping subsystems to implement feedback adjustment.

The pulse serial number information broadcasted and received by the space timekeeping subsystems constitutes a first database. At least three space timekeeping subsystems are configured, each of which independently measures multiple pulsars, calculates the moment at which the pulse of each serial number of each pulsar reaches the O-point, i.e., the pulse event (serial number-time), and broadcasts the pulse serial number information to observers.

Figure 5:
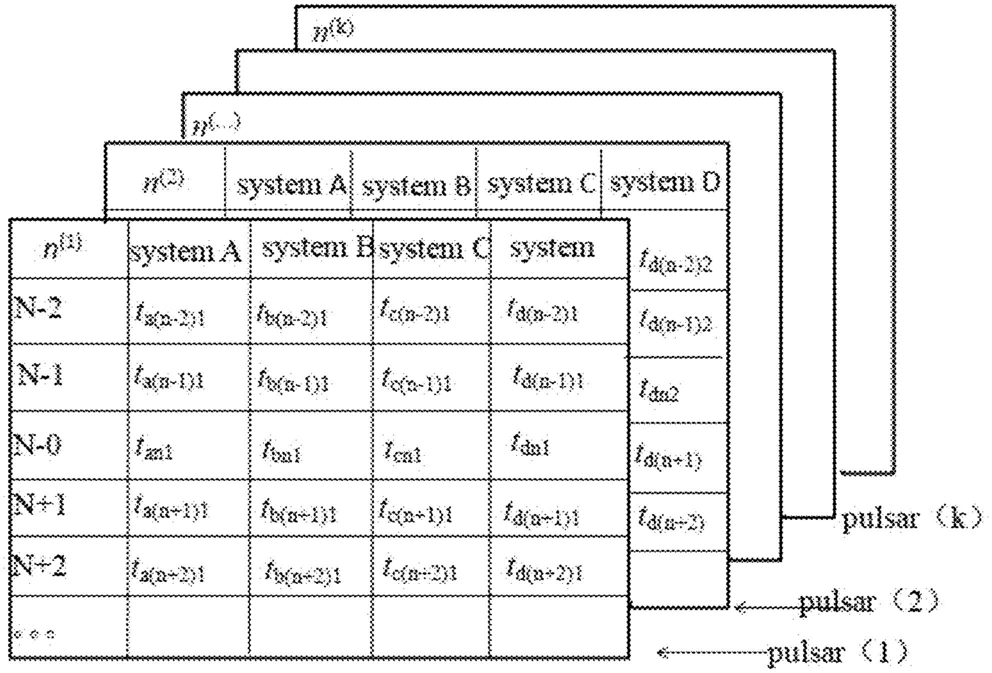
FIG. 5 is a schematic diagram of a data table provided in the embodiment of the present application, which is indexed by pulse serial numbers classified by pulsars.

The observer receives the pulse serial number information broadcasted by the space timekeeping subsystems, forming a data table classified by pulsars and indexed by pulse serial numbers (abbreviated as serial number table), which can also be referred to as a first data table for distinguishing from the data table classified by the space timekeeping subsystems. As shown in FIG. 5, the leftmost column of the first data table is the pulse serial number, and the different columns in the same row are the time of pulse events from various space timekeeping subsystems. Due to transmission barriers, the first data table may not be fully filled, and some cells in the first data table are allowed to be empty.

Secondly, it is judged whether the pulse event is abnormal and whether to eliminate the anomaly by shifting the initial epoch of the time axis of coordinate time. According to the initial epoch and requirements of the pulsar serial number rules, the time measured for the same pulse event (serial number-time) should be the same in the eyes of different observers, that is, the pulse serial number and the time measured by different space timekeeping subsystems in the same row of the form of the first data table shown in FIG. 5 should be the same. However, the measurement of each space timekeeping subsystem has errors and can only remain consistent within a certain allowable deviation range, also known as consistency criterion. If a space timekeeping subsystem exceeds the specified range, it indicates that the pulse event of this space timekeeping subsystem is abnormal, and the pulse event of this space timekeeping subsystem needs to be adjusted.

The relationships between the space timekeeping subsystems are equal, and each space timekeeping subsystem checks the difference between the time in the pulse event (serial number-time) and the average value of other space timekeeping subsystems. If the difference exceeds one complete period, it is necessary to shift the initial epoch of the time axis of coordinate time, shift the time coordinate axis, and increase or decrease by an integer multiple of the period.

Figure 6:
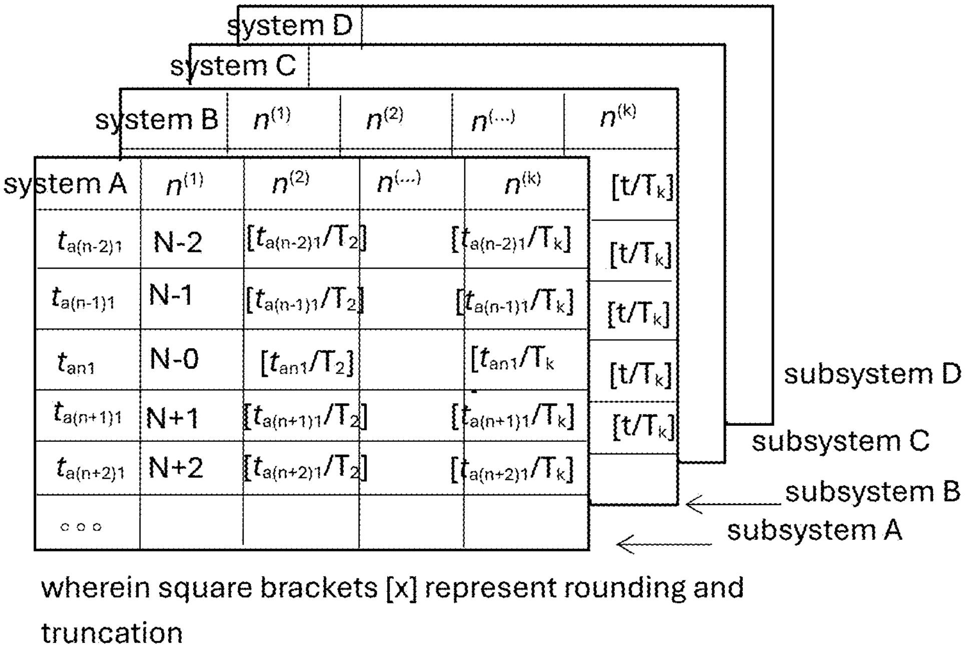
FIG. 6 is a schematic diagram of a data table provided in the embodiment of the present application, which is classified by pulsars.

FIG. 6 is a schematic diagram of a data table provided in the embodiment of the present application, which is classified by pulsars. As shown in FIG. 6, in the form of the data table classified by pulsars, the observer preferentially checks whether the pulse events of long-period pulsars are abnormal, and then checks short-period pulsars, so as to meet the requirement that under the same serial number within a certain allowable deviation range, the difference between the time of this observer and the average value is smaller than the value of one period $T_x$. In order to distinguish from the data table shown in FIG. 5, the data table classified by pulsars can also be referred to as a second data table.

The average value is the average value of time in the same pulse event of other space timekeeping subsystems except for the local observer. The differences in the time in the same pulse event between the space timekeeping subsystems participating in the average value calculation should not be larger than the period of the pulsar. If the differences are significant and the average value cannot be selected, then the principle of the minority being subordinate to the majority is adopted. After excluding the space timekeeping subsystem with the largest deviation, the average value of time is calculated, and the initial epoch of the time axis of coordinate time is shifted by the re-determined average value of time; alternatively, the time in the pulse event observed on Earth is used as a reference.

Finally, the local orbit parameter ephemeris is adjusted to further converge the time deviation in the pulse event to be smaller than ±0.5 $T_x$. If after long-term adjustment, which means that at least one period of revolution orbit is required, each space timekeeping subsystem can ensure that in the row of the form of the first data table corresponding to each pulse serial number of each pulsar, the time of the same serial number row is consistent within a certain allowable deviation range, then it indicates that the consistency requirement is met; for space timekeeping subsystems with large deviations, the local orbit parameter ephemeris can be adjusted to reduce the deviation.

The local orbit parameter ephemeris plays a regulatory role in the following two calculation processes. One is the process of calculating the delay time from local area to O-point using orbital position parameters and assigning O-point time to pulse events; and the other one is using local orbit parameters for transforming from the proper time to the coordinate time during the pulse profile measurement process.

In the embodiment of the present application, the set stability deviation algorithm of the pulsar database is also recorded, which specifically includes: each space timekeeping subsystem stores the same pulsar database, which is a set of multiple pulsar ephemerides, and the pulsar ephemerides include but are not limited to at least one of the following information: name of the pulsar, an azimuth vector of the pulsar, a pulse profile of the pulsar, an initial phase of the pulse profile, a zero-phase model of the pulse profile, a pulse period of the pulsar, a correction value of the pulse period, and a correction value of the initial phase.

Each space timekeeping subsystem checks its own pulse serial number information database and generates a data table classified by the space timekeeping subsystems and indexed by the coordinate time, abbreviated as a time table; as shown in FIG. 6, the leftmost column of the second data table is the coordinate time of the local observer, and the different columns in the same row are integer serial numbers of different pulsars at this moment. The serial numbers of the same row are taken as the input for the above set stability criterion inequation (4), and the matrix difference to the left of the inequation is calculated to obtain the set stability deviation.

The embodiment of the present application proposes a set stability deviation algorithm for the pulsar database, which does not involve how to agree on the pulsar database and its propagation.

Figure 7:
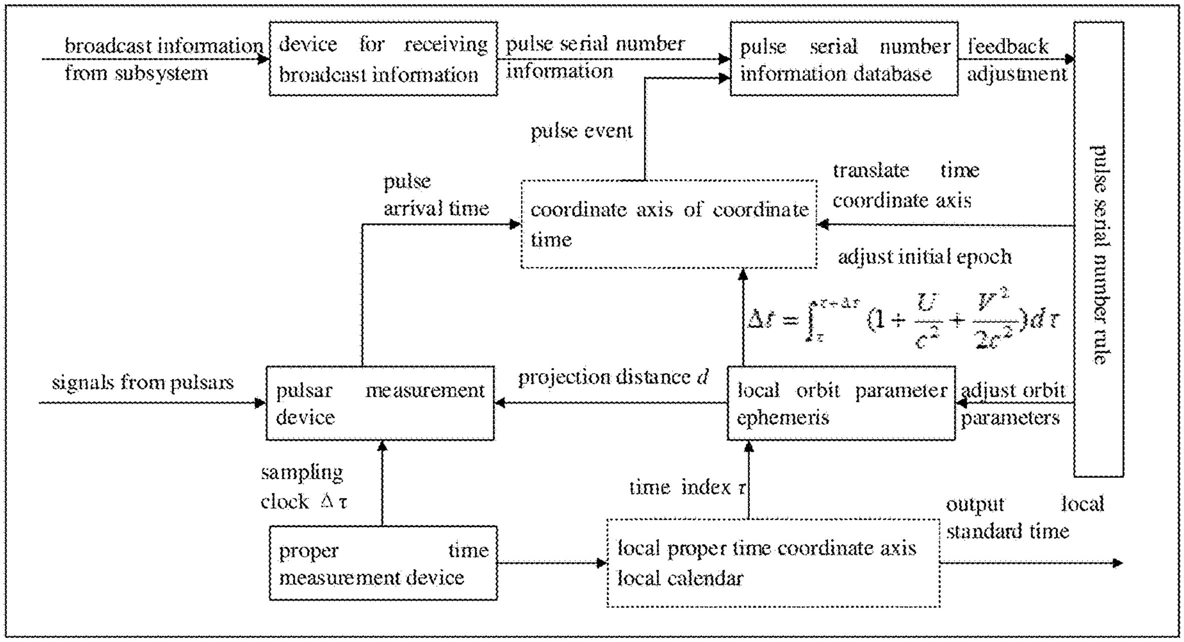
FIG. 7 is a schematic diagram of the structure of a time user system provided in the embodiment of the present application.

In the embodiment of the present application, a time user system is also recorded, which utilizes the pulsar serial number rule to receive the pulse serial number information broadcasted by other space timekeeping subsystems, measures the proper time and observes the pulse signals of pulsars, calculates and shifts the initial epoch of the time axis of its own coordinate time, and adjusts the local orbit parameter ephemeris to achieve a time user system with unified coordinate time. FIG. 7 is a schematic diagram of the structure of a time user system provided in the embodiment of the present application. As shown in FIG. 7, the time user system of the embodiment of the present application includes: a proper time measurement device, a pulsar measurement device, a device for receiving broadcast information, a local orbit parameter ephemeris, a pulse serial number information database, and a pulse serial number rule, etc. The solid-line boxes in FIG. 7 represent the components of the time user system, and the dashed-line boxes represent the variables during the transformation of the time coordinate axis.

In the embodiment of the present application, the time user system has the same hardware and software configuration as the space timekeeping subsystem, except that it cannot broadcast the pulse serial number information.

The proper time measurement device is the benchmark device for locally reproducing SI second, which is currently the SI second defined by cesium atomic clocks. In the future, if there is a new definition of SI, relevant devices recommended by the International System of Units will accordingly be used for the proper time measurement device. The proper time measurement device provides an equal-interval-sampling clock to the pulsar measurement device, establishes a local proper time coordinate axis, and a calendar rule reflecting periodic motion and based on the proper time coordinate axis, outputs local standard time, and provides a timing signal to the local area of the time user system to achieve time unification within the local area of the time user system.

Further, the proper time coordinate axis can be transformed through the following formula (5) so as to be associated with the coordinate axis of coordinate time. As long as the initial epoch of the coordinate time is known, the corresponding relationship between the scale lines on the two coordinate axes can be determined.

$$\Delta t = \int_{\tau}^{\tau+\Delta\tau}\left(1 + \frac{U}{c^2} + \frac{V^2}{2c^2}\right)d\tau; \tag{5}$$

in formula (5), Δt is the time interval of the time axis of the coordinate time; t is a time variable of local proper time; U is the local gravitational potential, Vis the linear velocity relative to the O-point, and c is the speed of light.

The pulsar measurement device is a measurement device that receives the arrival time of outputs pulses of pulsar signals. It is driven by the equal-interval clock provided by the local proper time for sampling, and receives pulsar photon signals for conversion into pulse profiles. Combined with the position of the local orbit parameter ephemeris, velocity and gravitational potential information, after Doppler time axis transformation, relativistic time axis transformation and projection distance spatiotemporal delay, the time when the current pulse serial number reaches the O-point is finally obtained, and is marked on the coordinate axis of coordinate time, forming a pulse event which is reported to the pulse serial number information database. For the transformation algorithm mentioned herein, reference can be made to the relevant records in the Chinese patent application for invention titled "Method for Unifying Time in Wide Area Space and Space Timekeeping Subsystem" with public number CN111665709A.

The device for receiving broadcast information is a device capable of receiving the pulse serial number information sent from other space timekeeping subsystems, and the pulse serial number information from different subsystems is directly stored in the pulse serial number information database.

The local orbit parameter ephemeris is a data table for corresponding the time with the space. The time index is the local proper time, and the data records are position vector, velocity vector, and gravitational potential. The time index on Earth is International Atomic Time (TAI), and the time index outside of Earth is not the Barycenter Dynamics Time (TDB) defined by the International Astronomical Union, but the time measured by the time user system's own proper time measurement device.

The pulse serial number information database is a database stored in the time user system, which collects the pulse serial number information broadcasted by various space timekeeping subsystems and the pulse event information generated by locally observing the pulsars. If the database information is discontinuous or leaves blank, the blank in the database should be supplemented through prediction algorithms.

The pulse serial number rule is an algorithm and criterion for processing the pulse serial number information database, and determining whether the data is reasonable. When it is found through local observation that a pulse event exceeds the allowable criterion deviation, the time user system can translate the initial epoch of the time axis of coordinate time to achieve the translation and adjustment of the time axis of coordinate time of the time user system. The translation amount is an integer multiple of the pulsar period. The local orbit parameter ephemeris can also be adjusted so that the pulse event time of the time user system is within the value of one pulsar period so as to remain consistent with most other subsystems, thus achieving the goal of time unification.

It should be understood that "one embodiment" or "an embodiment" mentioned throughout the specification means that specific features, structures, or characteristics related to the embodiment are included in at least one embodiment of the present disclosure. Therefore, "in one embodiment" or "in an embodiment" appearing throughout the specification may not necessarily refer to the same embodiment. In addition, these specific features, structures, or characteristics can be combined in any suitable way in one or more embodiments. It should be understood that in various embodiments of the present disclosure, the numbering of the above processes does not imply the order of execution. The execution order of processes should be determined by their functions and internal logic, and should not constitute any limitation to the implementation process of the embodiments of the present application. The numbering of the above embodiments of the present application is only for description and does not represent the advantages or disadvantages of the embodiments.

It should be noted that in this document, terms "include", "contain" or any other variation thereof are intended to encompass non-exclusive inclusion, such that a process, method, item, or device that includes a series of elements not only include those elements, but also include other elements that are not explicitly listed, or also include elements inherent to such a process, method, item, or device. Without further limitations, the element defined by the statement "including a" does not exclude the existence of another identical element in the process, method, item or device that include said element.

In the several embodiments provided in the present application, it should be understood that the disclosed device and method can be implemented in other ways. The device embodiment described above is only illustrative. For example, the division of units is only a logical functional division, and there may be other ways of division in actual implementation; for example, multiple units or components can be combined, or integrated into another system, or some features can be ignored or not executed. In addition, the coupling, direct coupling or communication connection between various components displayed or discussed can be indirect coupling or communication connection through some interfaces, devices or units, which can be in the electrical, mechanical, or other forms.

The units described above as separate components may be, or may not be physically separated, and the components displayed as units may be, or may not be physical units; they can either be located in one place, or distributed across multiple network units; some or all of the units can be selected according to actual needs to achieve the purpose of the present embodiment.

In addition, in each embodiment of the present disclosure, all functional units can be integrated into one processing unit, or each unit can serve as a separate unit, or two or more units can be integrated into one unit; the integrated units mentioned above can be implemented in the form of hardware, or in the form of both hardware and software functional units.

Described above are only embodiments of the present disclosure, but the scope of protection of the present disclosure is not limited to this. Changes or replacements that can be easily conceived by any of those skilled in the art within the technical scope disclosed in the present application should be covered within the scope of protection of the present disclosure. Therefore, the scope of protection of the present disclosure should be accorded with the scope of protection of the claims.

The invention claimed is:

1. A time unification method based on pulsar serial number rule, wherein the method comprises:

establishing a wide area inertial coordinate system in an inertial reference frame, and setting a mass center of all masses within its gravitational potential range or entire area as a coordinate origin, referred to as "O-point"; wherein observers in the wide area inertial coordinate system at least comprise a space timekeeping subsystem and a time user system; the O-point is a spatial reference point for all observers, with the gravitational potential at the O-point being zero and an observer's velocity at the O-point being zero; the observer at the O-point is a O-observer; and for all observers, pulsar pulse signals received by the O-observer and their corresponding pulsars have the following stable characteristics: pulsar orientation, pulse period, and pulse profile;

agreeing on a consistent initial epoch for multiple pulsars to meet the consistency requirement of pulsar serial number rule; wherein the consistency requirement is that for pulse signals with the same serial number from the same pulsar, based on the initial epoch, the time taken to reach the O-point converted into the O-observer's perspective is the same when measured by different observers;

broadcasting pulse serial number information through the space timekeeping subsystem, and transmitting the initial epoch within the spatiotemporal span of one pulse period, or inheriting the initial epoch agreed on by the existing space timekeeping subsystems; and implementing a feedback adjustment mechanism for the space timekeeping subsystem according to the pulse serial number information.

2. The method according to claim 1, wherein that "the pulsar pulse signals received by the O-observer and their corresponding pulsars have the following stable characteristics: pulsar orientation, pulse period, and pulse profile" comprises:

the pulsar orientation is orientation recognition or agreed orientation; the pulse period is period recognition or agreed period; and the pulse profile is pulse profile recognition or agreed profile;

wherein the orientation of a certain pulsar refers to the angular coordinate vector within the wide area inertial coordinate system, which is unanimously recognized by all observers; a dot product of the unit vector of the angular coordinate vector and the coordinates of the observer yields a projection distance of the observer at the orientation of the certain pulsar; in the direction from the O-point to the certain pulsar, the pulse signals sweep or reach the observer in the form of a plane electromagnetic wave, and also sweep or reach the O-point; a projection distance between the observer and the O-point in this direction and a time difference between the coordinate times when the plane electromagnetic wave of the same pulse signal sequentially sweeps the observer and the O-point conform to a two-dimensional spatiotemporal relationship, i.e., $\Delta t=d/c$, where $\Delta t$ is the time difference expressed in coordinate time in the unit of the Second of International System of Units (SI second); d is the projection distance of the observer in the direction of the certain pulsar in the unit of SI meter; and c is the speed of light.

3. The method according to claim 1, wherein the pulse periods of the multiple pulsars have set stability, and the set stability criterion for the pulse periods comprises that:

the agreed pulse periods of multiple pulsars are constants of a stable set, which are unanimously recognized by all observers, with the unit being SI second; the stable set refers to the phenomenon where pulse serial numbers and pulse periods of multiple pulsars received by the O-observer maintain a certain proportional relationship; the pulse serial numbers refer to the continuous pulse numbering sent by the pulsars after the initial epoch; and for k pulsars, the stable set expression is:

$$t_{oSSB} = n^{(1)}T_1 - p_1 + q_1(t) = n^{(2)}T_2 - p_2 + q_2(t) = \ldots = n^{(k)}T_k - p_k + q_k(t); \quad (1)$$

in formula (1), k=1, 2, . . . , represents multiple pulsars named or numbered 1, 2, . . . , k; $t_{oSSB}$ is the coordinate time at the O-point, and the unit is SI second; $n^{(k)}$ represents the serial number of the pulse of the pulsar named k reaching the O-point, and the superscript (k) represents the naming; $T_k$ is the period of pulsar, and the unit is SI second; $p_k$ is the initial phase of the pulse profile of pulsar; $q_k(t)$ is the time difference between the moment $t_{oSSB}$ and the moment when the integer pulse reaches the O-point; when an $n^{(k)}$ integer carrying event occurs, $q_k(t)=0$ and $q_k(t)<T_k$, and the unit is SI second;

the set stability criterion comprises: maximum allowable deviations $\varepsilon_2$, $\varepsilon_3$, . . . , $\varepsilon_k$ are set for 2 to k pulsars respectively to construct a criterion array to the right of the inequality sign in inequation (4), where NC represents no criterion; if a certain element in the criterion array in inequation (4) does not meet the inequality condition, then the period of the pulsar corresponding to the element that does not meet the condition is adjusted, or is removed from the set of pulse periods;

$$\begin{bmatrix} \frac{1}{T_1} \\ \frac{1}{T_2} \\ \vdots \\ \frac{1}{T_k} \end{bmatrix} [T_1 \ T_2 \ \ldots \ T_k] - \begin{bmatrix} n^{(1)} \\ n^{(2)} \\ \vdots \\ n^{(k)} \end{bmatrix} \begin{bmatrix} \frac{1}{n^{(1)}} & \frac{1}{n^{(2)}} & \cdots & \frac{1}{n^{(k)}} \end{bmatrix} \leq \begin{bmatrix} 0 & NC & \ldots & NC & NC \\ \frac{2}{n^{(1)}}+\varepsilon_2 & 0 & \ldots & NC & NC \\ \frac{2}{n^{(1)}}+\varepsilon_3 & \frac{2}{n^{(2)}}+\varepsilon_3 & 0 & \ldots & \vdots \\ \vdots & \vdots & \vdots & \ddots & NC \\ \frac{2}{n^{(1)}}+\varepsilon_k & \frac{2}{n^{(2)}}+\varepsilon_k & \ldots & \frac{2}{n^{(k-1)}}+\varepsilon_k & 0 \end{bmatrix}. \quad (4)$$

4. The method according to claim 2, wherein that the pulse profile is pulse profile recognition or agreed profile comprises:

the pulse profile of the pulsar means that each pulsar has a profile with its own characteristics, and the pulsar's own characteristics comprise shape characteristics in amplitude and phase characteristics in time; and the initial phase of the pulse profile of the O-observer is consistent, and a phase waveform of a specific radiation spectrum is agreed on; through transformation of time coordinate axis, the pulse profile expressed by the coordinate time of the O-observer is used by all observers as the unanimously recognized pulse profile.

5. The method according to claim 1, wherein the process of transmitting the initial epoch of the pulsar comprises broadcasting and receiving pulse serial number information;

the pulse serial number information broadcasted by the space timekeeping subsystem comprises at least one of the following:

the pulsar name k, the pulse serial number $n^{(k)}$, the time when the pulse reaches the O-point, i.e., the pulse origin time Ink, the space timekeeping subsystem x as a broadcaster, the moment when the space timekeeping subsystem x receives the pulse serial number $n^{(k)}$, the projection distance $d_{xk}$ from x to the O-point, and a delay time $t_{dx}$ for processing signals by the space timekeeping subsystem x; and the initial epoch of the pulsar means that for all pulsars recognized or agreed on by the space timekeeping subsystems, at the moment when the pulse numbered zero thereof reaches the O-point, the value of coordinate time is zero, and its initial phase is the difference between the starting point of the pulse profile and the origin of the time axis; for observers who have newly joined the space timekeeping system, a transmission or inheritance process is required to obtain the agreed initial epoch of the pulsar in one time, so that time axis origin or time zero point in the initial epoch of its coordinate time is unified with other space timekeeping subsystems; wherein the observers who have newly joined the space timekeeping system comprise new space timekeeping subsystems or time user system;

transmitting the initial epoch from the space timekeeping subsystem to the observer specifically comprises:

the time difference between adjacent integer serial numbers of the pulses is one pulse period interval; within a spatiotemporal range of one pulse period interval, observer b receives the pulse serial number information sent from the space timekeeping subsystem a; if the sum of information processing delay and spatial transmission delay is $\Delta t_s$, which is smaller than the pulse period $T_k$, i.e., $T_k > \Delta t_s$, then observer b calculates the delay time $\Delta t_s$ from the observation results of the pulse event after receiving the pulse serial number information, and translates the time axis of coordinate time to achieve the transmission of initial epoch from the space timekeeping subsystem a to observer b; specifically, the pulse event refers to the time when the pulse signal of the pulsar reaches the O-point and the corresponding serial number, represented as: event (serial number, time); observer b inherits the pulse event $(n^{(k)}, t_{ank})$ from the pulse serial number information of the space timekeeping subsystem a; the inheritance means that observer b assigns a value $t_{abnk}$ to the time corresponding to the event serial number $n^{(k)}$ of the pulsar named k; then, after observing for a period of time, observer b measures the next pulse event $(n^{(k)}+1, t_{bnk})$; within the spatiotemporal range of one pulse period, $T_k$ should be $\geq(t_{bnk}-t_{abnk})$; when and only when the initial epochs of observer b and the space timekeeping subsystem a are the same, the equal sign holds; since $\Delta t_s$ $t_{abnk}-t_{ank}$, $t_{bnk}-t_{abnk}$ $(T_k-\Delta t_s)$; by translating the time axis of coordinate time of observer b, the influence of the delay $\Delta t_s$ in the pulse serial number information is eliminated, so that the initial epochs of observer b and the space timekeeping subsystem a are the same, that is, $t_{bnk}$ $t_{ank}+T_k$;

translating the time axis of coordinate time means that a certain observer modifies the time $t_{bnk}$ in the observed pulse event $(n^{(k)}+1, t_{bnk})$ to make $t_{bnk}$ $t_{ank}+T_k=t_{abnk}+(T_k-\Delta t_s)$, and also modifies the serial number $n^{(j)}$ in the pulse event of another pulsar named j, which should meet the requirements of inequation (4), then $n'^{(j)}=n^{(j)}+[(T_k-\Delta t_s)/T_j]$, where $n^{(j)}$ and $n'^{(j)}$ are serial numbers of the pulsar named j before and after the observer's translation, respectively, $T_j$ is the period of pulsar j, $(T_k-\Delta t_s)$ is the translation amount of the coordinate time, and [•] is a truncation and rounding operator; and alternatively, the inheriting the initial epoch agreed on by the existing space timekeeping subsystems comprises that it can be specifically achieved by translating the coordinate axis of coordinate time: within the spatiotemporal span of one period, the space timekeeping subsystem a and observer b observe that the same one pulse signal of the same one pulsar reaches the O-point, and the pulse event $(n^{(k)}, t_{nk})$ is unique; the process of inheriting the initial epoch is only performed once to obtain the unanimously recognized initial epoch; the events referred to by the space timekeeping subsystem a and observer b are not limited to pulse events, but also comprise known events agreed on by both parties, which comprise bidirectional electromagnetic wave signals.

6. The method according to claim 5, wherein the implementing a feedback adjustment mechanism for the space timekeeping subsystem according to the pulse serial number information comprises:

forming a first database by the pulse serial number information broadcasted by the space timekeeping subsystem and the pulse serial number information received by all observers;

judging by the observer whether the pulse event is abnormal; in the case of an abnormal pulse event, adjusting the initial epoch of the coordinate axis of coordinate time to eliminate the anomaly by translating the time axis of coordinate time, wherein the translation amount is an integer multiple of the pulse period $T_x$ of the pulsar; and adjusting an orbit parameter ephemeris of the observe to converge the time deviation of the pulse event to be smaller than $\pm 0.5\ T_x$.

7. The method according to claim 6, wherein the "judging by the observer whether the pulse event is abnormal; in the case of an abnormal pulse event, adjusting the initial epoch of the coordinate axis of coordinate time to eliminate the anomaly by translating the time axis of coordinate time" comprises:

at least three space timekeeping subsystems are configured, each of which independently measures multiple pulsars to obtain pulse events, and broadcast the pulse serial number information to other observers based on the obtained pulse events;

the observers receive the pulse serial number information broadcasted by the at least three space timekeeping subsystems, and generate a first data table classified by pulsars and indexed by pulse serial numbers; wherein the leftmost column of the first data table is the pulse serial number, and the different columns in the same row are the time information in the pulse events of various space timekeeping subsystems; some cells in the first data table allow for no-data items;

according to the consistency requirement of the initial epoch and pulsar serial number rules, the time measured for the same pulse event by different observers is the same; the pulse serial number and the time measured by different space timekeeping subsystems in the same row in the first data table are theoretically be the same, known as consistency criterion;

each observer checks the difference between the time in the pulse event and an average value of the time in the pulse events of other space timekeeping subsystems; if the difference exceeds one pulse period, the initial epoch is adjusted and the time axis of coordinate time is translated, so that the time in the pulse event of the observer is consistent with the average value; the differences in the time in the same pulse event between the space timekeeping subsystems participating in the average value calculation should be smaller than or equal to the period of the pulsar corresponding to that pulse; if the differences in the time in the same pulse event between the space timekeeping subsystems participating in the average value calculation are larger than the value of the period of the pulsar corresponding to that pulse, or larger than a set threshold, then the principle of the minority being subordinate to the majority is adopted; after excluding the space timekeeping subsystem with the largest deviation, the average value of time is calculated, and the initial epoch of the time coordinate axis is adjusted with the re-determined average value of time; alternatively, the time in the pulse event observed on Earth is used as a reference;

in the first data table, the observer preferentially checks whether the pulse events of long-period pulsars are abnormal, and then checks the pulse events of short-period pulsars, so that the pulse events meet the requirement that under the same serial number within a certain allowable deviation range, the difference between the observer's time and the average value of time is smaller than one pulse period $T_x$, that is, the consistency criterion is met.

8. The method according to claim 6, wherein the adjusting an orbit parameter ephemeris of the observe to converge the time deviation of the pulse event to be smaller than ±0.5 $T_x$ comprises:

if, after feedback adjustment is performed for at least one period of revolution orbit, each space timekeeping subsystem can ensure that in the table row corresponding to the pulse serial number of each pulsar in the first data table, the time of the same serial number row is within a certain allowable deviation range, then it indicates that the consistency criterion is met; for space timekeeping subsystems that exceed the allowable deviation, the local orbit parameter ephemeris is adjusted to reduce the time deviation;

the local orbit parameter ephemeris plays a regulatory role in the following two calculation processes:

the process of calculating the delay time from local area to O-point using orbital position parameters and assigning O-point time to pulse events; and using local orbit parameters for transforming from the proper time to the coordinate time during the pulse profile measurement process.

9. The method according to claim 3, further comprising:

each space timekeeping subsystem stores the same pulsar database, which is a set of multiple pulsar ephemerides, and the pulsar ephemerides comprise at least one of the following information: name of the pulsar, an azimuth vector of the pulsar, a pulse profile of the pulsar, an initial phase of the pulse profile, a zero-phase model of the pulse profile, a pulse period of the pulsar, a correction value of the pulse period, and a correction value of the initial phase; and each space timekeeping subsystem checks its own pulse serial number information database and generates a second data table classified by the space timekeeping subsystems and indexed by the coordinate time; the leftmost column of the second data table is the coordinate time of the local observer, and the different columns in the same row are integer serial numbers of different pulsars at this moment; the serial numbers of the same row are taken as the input for the set stability criterion inequation (4), and the matrix difference to the left of inequation (4) is calculated to obtain the set stability deviation.

10. A time user system according to claim 1, wherein the system comprises: a proper time measurement device, a pulsar measurement device, a device for receiving broadcast information, a local orbit parameter ephemeris, a pulse serial number information database, and a pulse serial number rule;

the local orbit parameter ephemeris comprises at least one of the following: a local position vector, a local velocity vector, and a local gravitational potential indexed by the local proper time and with the O-point as a reference;

the proper time measurement device is used to obtain the local proper time; and the pulsar pulse measurement device is used to observe the pulse profile of the pulsar based on the local proper time, obtain the coordinate time at the moment when the pulse of the pulsar reaches the local area, and then use the local orbit parameter ephemeris to calculate the delay time of projection distance to obtain the O-point time.

11. The system according to claim 10, wherein the time user system has the same hardware and software configuration as the space timekeeping subsystem, except that it cannot broadcast the pulse serial number information; and the time user system is also used to receive the pulse serial number information broadcasted by the space timekeeping subsystems, and update the initial epoch of the coordinate axis of its own coordinate time, the pulsar database and the pulse serial number information database based on the pulse serial number information broadcasted by multiple space timekeeping subsystems.

12. The method according to claim 2, wherein the pulse periods of the multiple pulsars have set stability, and the set stability criterion for the pulse periods comprises that:

the agreed pulse periods of multiple pulsars are constants of a stable set, which are unanimously recognized by all observers, with the unit being SI second; the stable set refers to the phenomenon where pulse serial numbers and pulse periods of multiple pulsars received by the O-observer maintain a certain proportional relationship; the pulse serial numbers refer to the continuous pulse numbering sent by the pulsars after the initial epoch; and for k pulsars, the stable set expression is:

$$t_{oSSB} = n^{(1)}T_1 - p_1 + q_1(t) = n^{(2)}T_2 - p_2 + q_2(t) = \ldots = n^{(k)}T_k - p_k + q_k(t); \tag{1}$$

in formula (1), k=1, 2, . . . , represents multiple pulsars named or numbered 1, 2, . . . , k; $t_{oSSB}$ is the coordinate time at the O-point, and the unit is SI second; $n^{(k)}$ represents the serial number of the pulse of the pulsar named k reaching the O-point, and the superscript (k) represents the naming; $T_k$ is the period of pulsar, and the unit is SI second; $p_k$ is the initial phase of the pulse profile of pulsar; $q_k(t)$ is the time difference between the moment $t_{oSSB}$ and the moment when the integer pulse reaches the O-point; when an $n^{(k)}$ integer carrying event occurs, $q_k(t)=0$ and $q_k(t)<T_k$, and the unit is SI second;

the set stability criterion comprises: maximum allowable deviations 82, 83, . . . , Ek are set for 2 to k pulsars respectively to construct a criterion array to the right of the inequality sign in inequation (4), where NC represents no criterion; if a certain element in the criterion array in inequation (4) does not meet the inequality condition, then the period of the pulsar corresponding to the element that does not meet the condition is adjusted, or is removed from the set of pulse periods;

$$\begin{bmatrix} \frac{1}{T_1} \\ \frac{1}{T_2} \\ \vdots \\ \frac{1}{T_k} \end{bmatrix} [T_1 \ T_2 \ \ldots \ T_k] - \begin{bmatrix} n^{(1)} \\ n^{(2)} \\ \vdots \\ n^{(k)} \end{bmatrix} \begin{bmatrix} \frac{1}{n^{(1)}} & \frac{1}{n^{(2)}} & \ldots & \frac{1}{n^{(k)}} \end{bmatrix} \leq \tag{4}$$

-continued $$\begin{bmatrix} 0 & NC & \dots & NC & NC \\ \frac{2}{n^{(1)}}+\varepsilon_2 & 0 & \dots & NC & NC \\ \frac{2}{n^{(1)}}+\varepsilon_3 & \frac{2}{n^{(2)}}+\varepsilon_3 & 0 & \dots & \vdots \\ \vdots & \vdots & \vdots & \ddots & NC \\ \frac{2}{n^{(1)}}+\varepsilon_k & \frac{2}{n^{(2)}}+\varepsilon_k & \dots & \frac{2}{n^{(k-1)}}+\varepsilon_k & 0 \end{bmatrix}.$$

13. The method according to claim 7, further comprising:

each space timekeeping subsystem stores the same pulsar database, which is a set of multiple pulsar ephemerides, and the pulsar ephemerides comprise at least one of the following information: name of the pulsar, an azimuth vector of the pulsar, a pulse profile of the pulsar, an initial phase of the pulse profile, a zero-phase model of the pulse profile, a pulse period of the pulsar, a correction value of the pulse period, and a correction value of the initial phase; and each space timekeeping subsystem checks its own pulse serial number information database and generates a second data table classified by the space timekeeping subsystems and indexed by the coordinate time; the leftmost column of the second data table is the coordinate time of the local observer, and the different columns in the same row are integer serial numbers of different pulsars at this moment; the serial numbers of the same row are taken as the input for the set stability criterion inequation (4), and the matrix difference to the left of inequation (4) is calculated to obtain the set stability deviation.

14. The time user system of claim 10, wherein that "the pulsar pulse signals received by the O-observer and their corresponding pulsars have the following stable characteristics: pulsar orientation, pulse period, and pulse profile" comprises:

the pulsar orientation is orientation recognition or agreed orientation; the pulse period is period recognition or agreed period; and the pulse profile is pulse profile recognition or agreed profile;

wherein the orientation of a certain pulsar refers to the angular coordinate vector within the wide area inertial coordinate system, which is unanimously recognized by all observers; a dot product of the unit vector of the angular coordinate vector and the coordinates of the observer yields a projection distance of the observer at the orientation of the certain pulsar; in the direction from the O-point to the certain pulsar, the pulse signals sweep or reach the observer in the form of a plane electromagnetic wave, and also sweep or reach the O-point; a projection distance between the observer and the O-point in this direction and a time difference between the coordinate times when the plane electromagnetic wave of the same pulse signal sequentially sweeps the observer and the O-point conform to a two-dimensional spatiotemporal relationship, i.e., $\Delta t=d/c$, where $\Delta t$ is the time difference expressed in coordinate time in the unit of the Second of International System of Units (SI second); d is the projection distance of the observer in the direction of the certain pulsar in the unit of SI meter; and c is the speed of light.

15. The time user system of claim 10, wherein the pulse periods of the multiple pulsars have set stability, and the set stability criterion for the pulse periods comprises that:

the agreed pulse periods of multiple pulsars are constants of a stable set, which are unanimously recognized by all observers, with the unit being SI second; the stable set refers to the phenomenon where pulse serial numbers and pulse periods of multiple pulsars received by the O-observer maintain a certain proportional relationship; the pulse serial numbers refer to the continuous pulse numbering sent by the pulsars after the initial epoch; and for k pulsars, the stable set expression is:

$$t_{oSSB} = n^{(1)}T_1 - p_1 + q_1(t) = n^{(2)}T_2 - p_2 + q_2(t) = \dots = n^{(k)}T_k - p_k + q_k(t); \tag{1}$$

in formula (1), k=1, 2, . . . , represents multiple pulsars named or numbered 1, 2, . . . , k; $t_{oSSB}$ is the coordinate time at the O-point, and the unit is SI second; $n^{(k)}$ represents the serial number of the pulse of the pulsar named k reaching the O-point, and the superscript (k) represents the naming; $T_k$ is the period of pulsar, and the unit is SI second; $p_k$ is the initial phase of the pulse profile of pulsar; $q_k(t)$ is the time difference between the moment $t_{oSSB}$ and the moment when the integer pulse reaches the O-point; when an $n^{(k)}$ integer carrying event occurs, $q_k(t)=0$ and $q_k(t)<T_k$, and the unit is SI second;

the set stability criterion comprises: maximum allowable deviations $\varepsilon_2$, $\varepsilon_3$, . . . , $\varepsilon_k$ are set for 2 to k pulsars respectively to construct a criterion array to the right of the inequality sign in inequation (4), where NC represents no criterion; if a certain element in the criterion array in inequation (4) does not meet the inequality condition, then the period of the pulsar corresponding to the element that does not meet the condition is adjusted, or is removed from the set of pulse periods;

$$\begin{bmatrix} \frac{1}{T_1} \\ \frac{1}{T_2} \\ \vdots \\ \frac{1}{T_k} \end{bmatrix} [T_1 \ T_2 \ \dots \ T_k] - \begin{bmatrix} n^{(1)} \\ n^{(2)} \\ \vdots \\ n^{(k)} \end{bmatrix} \begin{bmatrix} \frac{1}{n^{(1)}} & \frac{1}{n^{(2)}} & \dots & \frac{1}{n^{(k)}} \end{bmatrix} \le \begin{bmatrix} 0 & NC & \dots & NC & NC \\ \frac{2}{n^{(1)}}+\varepsilon_2 & 0 & \dots & NC & NC \\ \frac{2}{n^{(1)}}+\varepsilon_3 & \frac{2}{n^{(2)}}+\varepsilon_3 & 0 & \dots & \vdots \\ \vdots & \vdots & \vdots & \ddots & NC \\ \frac{2}{n^{(1)}}+\varepsilon_k & \frac{2}{n^{(2)}}+\varepsilon_k & \dots & \frac{2}{n^{(k-1)}}+\varepsilon_k & 0 \end{bmatrix}. \tag{4}$$

16. The time user system of claim 14, wherein that the pulse profile is pulse profile recognition or agreed profile comprises:

the pulse profile of the pulsar means that each pulsar has a profile with its own characteristics, and the pulsar's own characteristics comprise shape characteristics in amplitude and phase characteristics in time; and the initial phase of the pulse profile of the O-observer is consistent, and a phase waveform of a specific radiation spectrum is agreed on; through transformation of time coordinate axis, the pulse profile expressed by the coordinate time of the O-observer is used by all observers as the unanimously recognized pulse profile.

17. The time user system of claim 10, wherein the implementing a feedback adjustment mechanism for the space timekeeping subsystem according to the pulse serial number information comprises:

forming a first database by the pulse serial number information broadcasted by the space timekeeping subsystem and the pulse serial number information received by all observers;

judging by the observer whether the pulse event is abnormal; in the case of an abnormal pulse event, adjusting the initial epoch of the coordinate axis of coordinate time to eliminate the anomaly by translating the time axis of coordinate time, wherein the translation amount is an integer multiple of the pulse period $T_x$ of the pulsar; and adjusting an orbit parameter ephemeris of the observe to converge the time deviation of the pulse event to be smaller than $\pm 0.5\ T_x$.

18. The time user system of claim 17, wherein the "judging by the observer whether the pulse event is abnormal; in the case of an abnormal pulse event, adjusting the initial epoch of the coordinate axis of coordinate time to eliminate the anomaly by translating the time axis of coordinate time" comprises:

at least three space timekeeping subsystems are configured, each of which independently measures multiple pulsars to obtain pulse events, and broadcast the pulse serial number information to other observers based on the obtained pulse events;

the observers receive the pulse serial number information broadcasted by the at least three space timekeeping subsystems, and generate a first data table classified by pulsars and indexed by pulse serial numbers; wherein the leftmost column of the first data table is the pulse serial number, and the different columns in the same row are the time information in the pulse events of various space timekeeping subsystems; some cells in the first data table allow for no-data items;

according to the consistency requirement of the initial epoch and pulsar serial number rules, the time measured for the same pulse event by different observers is the same; the pulse serial number and the time measured by different space timekeeping subsystems in the same row in the first data table are theoretically be the same, known as consistency criterion;

each observer checks the difference between the time in the pulse event and an average value of the time in the pulse events of other space timekeeping subsystems; if the difference exceeds one pulse period, the initial epoch is adjusted and the time axis of coordinate time is translated, so that the time in the pulse event of the observer is consistent with the average value; the differences in the time in the same pulse event between the space timekeeping subsystems participating in the average value calculation should be smaller than or equal to the period of the pulsar corresponding to that pulse; if the differences in the time in the same pulse event between the space timekeeping subsystems participating in the average value calculation are larger than the value of the period of the pulsar corresponding to that pulse, or larger than a set threshold, then the principle of the minority being subordinate to the majority is adopted; after excluding the space timekeeping subsystem with the largest deviation, the average value of time is calculated, and the initial epoch of the time coordinate axis is adjusted with the re-determined average value of time; alternatively, the time in the pulse event observed on Earth is used as a reference;

in the first data table, the observer preferentially checks whether the pulse events of long-period pulsars are abnormal, and then checks the pulse events of short-period pulsars, so that the pulse events meet the requirement that under the same serial number within a certain allowable deviation range, the difference between the observer's time and the average value of time is smaller than one pulse period $T_x$, that is, the consistency criterion is met.

19. The time user system of claim 17, wherein the adjusting an orbit parameter ephemeris of the observe to converge the time deviation of the pulse event to be smaller than $+0.5\ T_x$ comprises:

if, after feedback adjustment is performed for at least one period of revolution orbit, each space timekeeping subsystem can ensure that in the table row corresponding to the pulse serial number of each pulsar in the first data table, the time of the same serial number row is within a certain allowable deviation range, then it indicates that the consistency criterion is met; for space timekeeping subsystems that exceed the allowable deviation, the local orbit parameter ephemeris is adjusted to reduce the time deviation;

the local orbit parameter ephemeris plays a regulatory role in the following two calculation processes:

the process of calculating the delay time from local area to O-point using orbital position parameters and assigning O-point time to pulse events; and using local orbit parameters for transforming from the proper time to the coordinate time during the pulse profile measurement process.

20. The time user system of claim 15, further comprising:

each space timekeeping subsystem stores the same pulsar database, which is a set of multiple pulsar ephemerides, and the pulsar ephemerides comprise at least one of the following information: name of the pulsar, an azimuth vector of the pulsar, a pulse profile of the pulsar, an initial phase of the pulse profile, a zero-phase model of the pulse profile, a pulse period of the pulsar, a correction value of the pulse period, and a correction value of the initial phase; and each space timekeeping subsystem checks its own pulse serial number information database and generates a second data table classified by the space timekeeping subsystems and indexed by the coordinate time; the leftmost column of the second data table is the coordinate time of the local observer, and the different columns in the same row are integer serial numbers of different pulsars at this moment; the serial numbers of the same row are taken as the input for the set stability criterion inequation (4), and the matrix difference to the left of inequation (4) is calculated to obtain the set stability deviation.

* * * * *